(12) United States Patent
Mukai et al.

(10) Patent No.: US 8,535,460 B2
(45) Date of Patent: Sep. 17, 2013

(54) LOW CO HYDROGEN STORAGE ALLOY

(75) Inventors: Daisuke Mukai, Saitama (JP); Shigeki Nakayama, Saitama (JP); Kiyotaka Yasuda, Saitama (JP); Shinya Kagei, Saitama (JP); Hidetoshi Inoue, Hiroshima (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 984 days.

(21) Appl. No.: 10/566,433

(22) PCT Filed: Aug. 6, 2004

(86) PCT No.: PCT/JP2004/011378
§ 371 (c)(1),
(2), (4) Date: Jan. 31, 2006

(87) PCT Pub. No.: WO2005/014871
PCT Pub. Date: Feb. 17, 2005

(65) Prior Publication Data
US 2006/0188385 A1    Aug. 24, 2006

(30) Foreign Application Priority Data
Aug. 8, 2003 (JP) .................................. 2003-290784

(51) Int. Cl.
*C22C 19/03* (2006.01)

(52) U.S. Cl.
USPC ............................ 148/429; 420/455; 420/900

(58) Field of Classification Search
USPC .................. 148/429; 204/293; 420/455, 900
See application file for complete search history.

(56) References Cited

U.S. PATENT DOCUMENTS 5,910,379 A * 6/1999 Kasashima et al. ............. 429/59
6,261,517 B1 * 7/2001 Kaneko et al. ................ 420/455
6,372,059 B1 * 4/2002 Yasuda et al. ................. 148/426

FOREIGN PATENT DOCUMENTS

| EP | 1 227 165 | 7/2002 |
| JP | 57-063670 | 4/1982 |
| JP | 06-283170 | 10/1994 |
| JP | 09-213319 | 8/1997 |
| JP | 2001-040442 | 2/2001 |
| JP | 2001-181763 | 7/2001 |
| JP | 2001-348636 | 12/2001 |
| JP | 2002-212601 | 7/2002 |
| JP | 2002-294373 | 10/2002 |
| JP | 2004-131825 | 4/2004 |
| WO | WO 03/056047 A1 | 7/2003 |

OTHER PUBLICATIONS

Takeshita, T., "Low-temperature heat-capacity study of Haucke compounds CaNi5, YNi5, LaNi5, and ThNi5", Physical Review B, vol. 21, No. 12, Jun. 15, 1980, pp. 5636-5641.*

Suzuki et al., "Improvement of Characteristics of Hydrogen Storage of Mischmetal-Nickel-Manganese Alloy", Bulletin of the Government Industrial Research Institute, Osaka, 35[2], pp. 20-26, 1984.

* cited by examiner

*Primary Examiner* — Jessee R. Roe
(74) *Attorney, Agent, or Firm* — The Webb Law Firm

(57) ABSTRACT

A hydrogen storage alloy is provided which has an extremely low Co content, and can maintain the drain (power) performance (especially pulse discharge characteristics), activity (degree of activity), and life performance at high levels. The hydrogen storage alloy is manufactured by weighing and mixing every material for the hydrogen storage alloy so as to provide an alloy composition represented by the general formula $MmNi_aMn_bAl_cCo_d$ or $MmNi_aMn_bAl_cCo_dFe_e$, and controlling the manufacturing method and manufacturing conditions so that both the a-axis length and the c-axis length of the crystal lattice are in a predetermined range. Although it is sufficient if the a-axis length of the crystal lattice is 499 pm or more and the c-axis length is 405 pm or more, by further specifying the a-axis length and c-axis length depending on the values of ABx, a hydrogen storage alloy having high durability can be provided.

7 Claims, 13 Drawing Sheets

Sample 26 : MmAl0.35Mn0.35Co0.10Ni4.50

Mn0.35mol

Sample 26 : MmAl0.35Mn0.35Co0.10Ni4.50

Mn0.35mol

Sample 9 : MmAl0.35Mn0.40Co0.10Ni4.45

Mn0.40mol

Sample 14: MmAl0.35Mn0.45Co0.10Ni4.40

Mn0.45mol

Sample 22: MmAl0.35Mn0.50Co0.10Ni4.35

Mn0.50mol

Sample 22 : MmAl0.35Mn0.50Co0.10Ni4.35

Mn0.50mol

Sample 6 : MmAl0.35Mn0.55Co0.10Ni4.30

Mn0.55mol

Sample 6 : MmAl0.35Mn0.55Co0.10Ni4.30

Sample 10 : MmAl0.35Mn0.60Co0.10Ni4.25

Sample 10: MmAl0.35Mn0.60Co0.10Ni4.25

Sample 26: MmAl0.35Mn0.35Co0.10Ni4.50

Sample 9 : MmAl0.35Mn0.40Co0.10Ni4.45

Mn0.40mol

Sample 14 : MmAl0.35Mn0.45Co0.10Ni4.40

Mn0.45mol

Sample 22 : MmAl0.35Mn0.50Co0.10Ni4.35

Mn0.50mol

Sample 6 : MmAl0.35Mn0.55Co0.10Ni4.30

Mn0.55mol

Sample 10 : MmAl0.35Mn0.60Co0.10Ni4.25

Mn0.60mol $5.20 \leqq AB_x < 5.25$

LOW CO HYDROGEN STORAGE ALLOY

CROSS-REFERENCE TO RELATED APPLICATIONS

The present application is base on International Application PCT/JP2004/011378 filed on Aug. 6, 2004, and Japanese Patent Applications No. 2003-290784 filed on Aug. 8, 2003, which applications are incorporated herein by reference in its entirety.

TECHNICAL FIELD

The present invention relates to an $AB_5$-type hydrogen storage alloy having a $CaCu_5$-type crystal structure, more specifically to a hydrogen storage alloy having an extremely low cobalt content in the alloy, and nevertheless having drain (power) performance, activity and life performance especially required in electric vehicles and hybrid vehicles.

BACKGROUND ART

Since a hydrogen storage alloy is an alloy that reacts with hydrogen to form a metal hydride, and reversibly absorb and desorb a large quantity of hydrogen around room temperature, the actual application has been studied in various fields, such as a nickel-hydrogen battery used in hybrid vehicles or digital still cameras.

As a hydrogen storage alloy, various alloys have been known, such as an $AB_5$-type alloy represented by $LaNi_5$ and an $AB_2$-type alloy represented by $ZrV_{0.4}Ni_{1.5}$, as well as an AB-type alloy and an $A_2B$-type alloy. Many of these are composed of an combination of an element group having a high affinity with hydrogen and a large hydrogen storage capacity (Ca, Mg, rare-earth elements, Ti, Zr, V, Nb, Pt, Pd, etc.), and an element group having a relatively low affinity with hydrogen and a small hydrogen storage capacity, but having a high hydrogenation reaction rate and lowering the reaction temperature (Ni, Mn, Cr, Fe, etc.) Since any types of these alloys largely vary the characteristics depending on the composition, various alloy compositions have been studied with the objectives of improving the maximum hydrogen storage capacity and effective hydrogen storage capacity (increase of capacity), prolonging the life performance, and obtaining higher output.

Among them, the study group of the present inventors has focused attention on and studied an $AB_5$-type hydrogen storage alloy having a $CaCu_5$-type crystal structure, specifically Mm-Ni—Mn—Al—Co alloy consisting of Mm (Misch metal), which is a rare-earth mixture, in the A site, and four elements of Ni, Al, Mn and Co in the B site. This type of Mm-Ni—Mn—Al—Co alloy has features that can compose a negative electrode using relatively inexpensive materials compared with La-based alloys, and can obtain a closed-type nickel-hydrogen secondary battery with long cycle life and little internal pressure elevation due to gases generated in overcharging.

Meanwhile, in the composing elements of the Mm-Ni—Mn—Al—Co alloy, since Co is an important element to suppress pulverization of the alloy, and to exert the effect of improving life performance, heretofore, about 10% by weight of Co (molar ratio: 0.6 to 1.0) was generally and conventionally compounded. However, Co is a very expensive metal, and it is preferable to reduce Co when taking account of the future expansion of use of hydrogen storage alloys. However, the reduction of Co leads to lowering of drain (power) performance and life performance; it has therefore been a research project to reduce Co while maintaining drain (power) performance and life performance. Particularly, in order to develop the application of hydrogen storage alloy into a power source and the like for electric vehicles (EV) and hybrid electric vehicles (HEV, motor vehicles using two power sources of electric motors and internal combustion engines), it has been an essential challenge to maintain drain (power) performance and life performance at high levels.

In view of these problems, various proposals to reduce Co quantities and still maintain the cell performance have been disclosed.

For example, Patent Document 1 (Japanese Patent Application Laid-Open No. 9-213319) proposes to change the composition of Mm-Ni—Mn—Al—Co-based alloy, and further add a small quantity of a single element to the alloy.

Patent Document 2 (Japanese Patent Application Laid-Open No. 2002-294373) proposes a hydrogen storage alloy having the composition of Equation (1), of substantially single phase, wherein the average major axis of the crystal is 30 to 160 µm, or 5 µm to less than 30 µm.

$RNi_xCo_yM_z$ ... (1) (R: rare-earth element or the like; M: Mg, Al, Mn or the like; $3.7 \leq x \leq 5.3$, $0.1 \leq y \leq 0.5$, $0.1 \leq z \leq 1.0$, $5.1 \leq x+y+z \leq 5.5$)

The study group that the present inventors belong also proposes, for example in Patent Document 3 (Japanese Patent Application Laid-Open No. 2001-18176), a hydrogen storage alloy having a $CaCu_5$-type crystal structure represented by general formula $MmNi_aMn_bCo_cCu_d$, where Mm is a Misch metal, $3.7 \leq a \leq 4.2$, $0.3 < b \leq 0.6$, $0.2 \leq c \leq 0.4$, $0 < d \leq 0.4$, $5.00 \leq a+b+c+d \leq 5.35$, as a hydrogen storage alloy that has a reduced cobalt content, has excellent hydrogen storage capacity, has favorable pulverization performance, initial performance and drain (power) performance, and has high reliability in durability and storage stability.

In Patent Document 4 (Japanese Patent Application Laid-Open No. 2001-40442), the study group proposes a hydrogen storage alloy having a $CaCu_5$-type crystal structure represented by general formula $MmNi_aMn_bAl_cCo_dX_e$ (Mm being a Misch metal, X being Fe and/or Cu, $3.7 \leq a \leq 4.2$, $0 \leq b \leq 0.3$, $0 \leq c \leq 0.4$, $0.2 \leq d \leq 0.4$, $0 \leq e \leq 0.4$, $5.00 \leq a+b+c+d+e \leq 5.20$, provided that b and c are not simultaneously 0, and when $0 < b \leq 0.3$ and $0 < c \leq 0.4$, $b+c < 0.5$) as a hydrogen storage alloy wherein the cobalt content is reduced, having excellent hydrogen storage capacity, having pulverization performance, favorable initial performance and drain (power) performance, and having high reliability in durability and storage stability.

In Patent Document 5 (Japanese Patent Application Laid-Open No. 2001-348636) the study group proposes an $AB_5$-type hydrogen storage alloy having a $CaCu_5$-type crystal structure represented by the general formula $MmNi_aMn_bAl_cCo_d$, where Mm is a Misch metal, $4.1 < a \leq 4.3$, $0.4 < b \leq 0.6$, $0.2 \leq c \leq 0.4$, $0.1 \leq d \leq 0.4$, $5.2 \leq a+b+c+d \leq 5.45$), or represented by the general formula $MmNi_aMn_bAl_cCo_dX_e$ (where Mm is a Misch metal, X is Cu and/or Fe, $4.1 < a \leq 4.3$, $0.4 < b \leq 0.6$, $0.2 \leq c \leq 0.4$, $0.1 \leq d \leq 0.4$, $0 < e \leq 0.1$, $5.2 \leq a+b+c+d+e \leq 5.45$, as a hydrogen storage alloy that is produced at a reduced cost by extremely reducing the cobalt content, has excellent pulverization performance and hydrogen storage capacity, and has favorable drain (power) performance and storage stability.

Patent Document 1: Japanese Patent Application Laid-Open No. 9-213319

Patent Document 2: Japanese Patent Application Laid-Open No. 2002-294373

Patent Document 3: Japanese Patent Application Laid-Open No. 2001-18176

Patent Document 4: Japanese Patent Application Laid-Open No. 2001-40442

Patent Document 5: Japanese Patent Application Laid-Open No. 2001-348636

DISCLOSURE OF THE INVENTION

Problems to be Solved by the Invention

As described above, the study group that the present inventors belong previously proposed that cell life performance could be maintained by controlling the lattice length of c-axis in a predetermined range even with a hydrogen storage alloy having a low Co composition. However, while proceeding development for next-generation electric vehicles and hybrid electric vehicles, it was realized that there was limitation in the idea of "controlling the lattice length of the c-axis" in order to further reduce the quantity of Co, and to maintain drain (power) performance (particularly pulse discharge characteristics), activity (degree of activity) and life performance at high levels.

Therefore, an object of the present invention is to provide a low Co hydrogen storage alloy that can maintain the high levels of drain (power) performance (particularly pulse discharge characteristics), activity (degree of activity) and life performance, even if the Co content is further reduced to a lower level.

Means to Solve the Problems

As a result of the repeated studies by the present inventors in view of the above-described problems, it was found that even if the composition proportion (molar ratio) of Co was reduced to 0.35 or less in the composition of the alloy represented by the general formula $MmNi_aMn_bAl_cCo_d$, all of the levels of drain (power) performance (particularly pulse discharge characteristics), activity (degree of activity) and life performance could be elevated by raising the composition proportion (molar ratio) of Ni having hydrogen catalytic potency to 4.0 or more, adjusting the alloy composition so that the composition proportion (molar ratio) of Mn was in a predetermined range, and controlling manufacturing conditions so that both the a-axis length and the c-axis length of the crystal lattice were within a predetermined range, and on the basis of such findings, the inventors has come to the present invention. The present inventors also found that the same or even better results could be obtained by the alloy composition represented by the general formula $MmNi_aMn_bAl_cCo_dFe_e$, and on the basis of such findings, the inventors has come to the present invention.

The present invention proposes a low Co hydrogen storage alloy having a $CaCu_5$-type crystal structure that can be represented by the general formula $MmNi_aMn_bAl_cCo_d$, where Mm is a Misch metal, $4.0 \leq a \leq 4.7$, $0.3 \leq b \leq 0.65$, $0.2 \leq c \leq 0.5$, $0 < d \leq 0.35$, $5.2 \leq a+b+c+d \leq 5.5$, or the general formula $MmNi_aMn_bAl_cCo_dFe_e$, where Mm is a Misch metal, $4.0 \leq a \leq 4.7$, $0.3 \leq b \leq 0.65$, $0.2 \leq c \leq 0.5$, $0 < d \leq 0.35$, $0 < e \leq 0.11$, $5.2 \leq a+b+c+d+e \leq 5.5$, characterized in that the a-axis length of the crystal lattice of said $CaCu_5$-type crystal structure is 499 pm or more, and the c-axis length is 405 pm or more.

With such a low Co hydrogen storage alloy having a $CaCu_5$-type crystal structure that can be represented by the general formula $MmNi_aMn_bAl_cCo_d$, where $4.0 \leq a \leq 4.7$, $0.3 \leq b \leq 0.65$, $0.2 \leq c \leq 0.5$, $0 < d \leq 0.35$, $5.2 \leq a+b+c+d \leq 5.5$), or a general formula $MmNi_aMn_bAl_cCo_dFe_e$, where Mm is a Misch metal, $4.0 \leq a \leq 4.7$, $0.3 \leq b \leq 0.65$, $0.2 \leq c \leq 0.5$, $0 < d \leq 0.35$, $0 < e \leq 0.11$, $5.2 \leq a+b+c+d+e \leq 5.5$, characterized in that the a-axis length of the crystal lattice of said $CaCu_5$-type crystal structure is 499 pm or more, and the c-axis length is 405 pm or more, drain (power) performance (particularly pulse discharge characteristics), activity (degree of activity) and life performance can be elevated to high level even if the Co content is further reduced to a lower level than conventional levels. Specifically, the quantity of Co can be reduced to a degree required in applications to electric vehicles and hybrid electric vehicles (specifically the negative electrode active material for batteries used in electric vehicles and hybrid electric vehicles), the life performance can be maintained and the activity can be improved to 80% or higher.

In the present invention, "the a-axis length and the c-axis length of the crystal lattice" are the values calculated by measuring the alloy powder formed by grinding the ingot-shaped hydrogen storage alloy and classifying to adjust to −20 μm (particle size that passes through the screen having the mesh of 20 μm) using a powder X-ray diffraction apparatus by CuKα line at a scanning speed of 1°/min at an angle of 100° to 150°, and performing the refining of the lattice constant using an error function measuring method (Wilson & Pike method). The values of the a-axis length and the c-axis length specified in the present invention include a variation of ±0.1 pm. The peaks used for refining are as follows:

Peak indexed by Miller index (303) around 100° to 104°
Peak indexed by Miller index (321) around 105° to 106°
Peak indexed by Miller index (402) around 106° to 107°
Peak indexed by Miller index (411) around 110° to 114°
Peak indexed by Miller index (313) around 116° to 118°
Peak indexed by Miller index (412) around 126° to 129°
Peak indexed by Miller index (501) around 129° to 132°
Peak indexed by Miller index (331) around 139° to 142°

Even if the upper-limit value and the lower-limit value of the value range specified by the present invention are slightly beyond the specified value range, they are included in the scope of the present invention as long as they have the effect equivalent to within the value range.

BEST MODE FOR CARRYING OUT THE INVENTION

Figure 1:
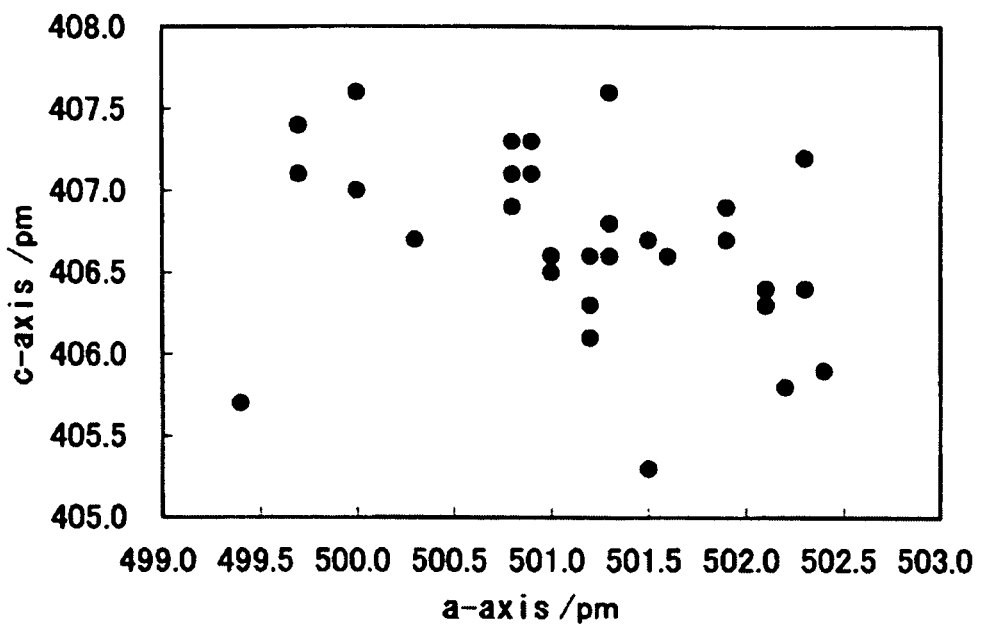
FIG. 1 is a graph wherein samples 1 to 30 are plotted in a coordinate consisting of a horizontal axis showing a-axis lengths and a vertical axis showing c-axis length.

The embodiments of the present invention will be described below in detail. However, the scope of the present invention is not limited by the embodiments described below.

The hydrogen storage alloy of the present invention is a low Co hydrogen storage alloy having a $CaCu_5$-type crystal structure that can be represented by the general formula $MmNi_aMn_bAl_cCo_d$, where Mm is a Misch metal, $4.0 \leq a \leq 4.7$, $0.3 \leq b \leq 0.65$, $0.2 \leq c \leq 0.5$, $0 < d \leq 0.35$, $5.2 \leq a+b+c+d \leq 5.5$, or a general formula $MmNi_aMn_bAl_cCo_dFe_e$, where Mm is a Misch metal, $4.0 \leq a \leq 4.7$, $0.3 \leq b \leq 0.65$, $0.2 \leq c \leq 0.5$, $0 < d \leq 0.35$, $0 < e \leq 0.11$, $5.2 \leq a+b+c+d+e \leq 5.5$, and is a low Co hydrogen storage alloy of an ABx type having a $CaCu_5$-type crystal structure wherein the a-axis length of the crystal lattice of the $CaCu_5$-type crystal structure is 499 pm or more, and the c-axis length is 405 pm or more.

Since a proportion of the total number of moles of elements composing the B site to the total number of moles of elements composing the A site in the ABx composition, a+b+c+d (this proportion is also referred to as "ABx"), is $5.2 \leq ABx \leq 5.5$, the low Co hydrogen storage alloy of the present invention is composed of a B site rich non-stoichiometric composition. The ABx within this range can maintain battery life and the pulverization performance, and can maintain hydrogen storage characteristics and drain (power) performance. Above all, it is preferable that ABx is 5.25 or more, and 5.45 or less.

In the low Co hydrogen storage alloy of the present invention, the a-axis length is preferably 499 pm or more, and 503 pm or less. Especially, it is more preferably 499.7 pm or more, and 502.7 pm or less. On the other hand, the c-axis length is more preferably 405 pm or more, and 408 pm or less. Above all, it is especially preferable to be 405.6 pm or more, and 407.4 pm or less.

For example, it is a preferable example that the a-axis length is 499.7 to 501.2 pm, and the c-axis length is 405.6 to 406.2 pm.

The present inventors further found that preferable a-axis length and c-axis length were different depending on the level of ABx, and have proposed preferable a-axis length and c-axis length for each ABx range on the basis of the finding.

For low Co hydrogen storage alloys having a $CaCu_5$-type crystal structure that can be represented by the general formula $MmNi_aMn_bAl_cCo_d$:

(a) In compositions of $5.25 \leq ABx < 5.30$, it is preferable that the a-axis length is not less than 500.5 pm and not more than 502.7 pm, and the c-axis length is not less than 405.6 pm and not more than 406.9 pm.

(b) In compositions of 5.30≦ABx<5.35, it is preferable that the a-axis length is not less than 500.0 pm and not more than 502.4 pm, and the c-axis length is not less than 405.9 pm and not more than 407.2 pm.

(c) In compositions of 5.35≦ABx<5.40, it is preferable that the a-axis length is not less than 499.8 pm and not more than 502.3 pm, and the c-axis length is not less than 406.0 pm and not more than 407.3 pm.

(d) In compositions of 5.40≦ABx<5.45, it is preferable that the a-axis length is not less than 499.7 pm and not more than 502.3 pm, and the c-axis length is not less than 406.1 pm and not more than 407.4 pm.

For low Co hydrogen storage alloys having a $CaCu_5$-type crystal structure that can be represented by the general formula $MmNi_aMn_bAl_cCo_dFe_e$:

(e) In compositions of 5.25≦ABx<5.30, it is preferable that the a-axis length is not less than 500.5 pm and not more than 502.7 pm, and the c-axis length is not less than 406.6 pm and not more than 407.9 pm.

(f) In compositions of 5.30≦ABx<5.35, it is preferable that the a-axis length is not less than 500.0 pm and not more than 502.4 pm, and the c-axis length is not less than 406.9 pm and not more than 408.2 pm.

(g) In compositions of 5.35≦ABx<5.40, it is preferable that the a-axis length is not less than 499.8 pm and not more than 502.3 pm, and the c-axis length is not less than 407.0 pm and not more than 408.3 pm.

(h) In compositions of 5.40≦ABx<5.45, it is preferable that the a-axis length is not less than 499.7 pm and not more than 502.3 pm, and the c-axis length is not less than 407.1 pm and not more than 408.4 pm.

By controlling the a-axis length and c-axis length to the above-described ranges depending on the range of each ABx, a hydrogen storage alloy that has the life performance required by hybrid vehicles can be obtained. The required life performance, specifically, is a performance wherein the proportion of post-cycling particle size against pre-cycling particle size (pulverization residual rate (%)) is 50% or more, when a hydrogen storage alloy is ground and screened to select particles with a particle size in a range of 20 μm and 53 μm to provide hydrogen storage alloy powder, and after measuring with a particle size distribution measuring device the average particle size (pre-cycling particle size, $D_{50}$) of the hydrogen storage alloy powder; 2 g of the hydrogen storage alloy powder is weighed and placed into a PCT holder; the surfaces thereof are cleaned under hydrogen pressure of 1.75 MPa twice; then activation is carried out twice by introducing hydrogen of 3 MPa; next, a cycle test using a PCT device is then repeated 50 times, wherein hydrogen gas of 3 MPa is introduced into 2.0 g of the hydrogen storage alloy powder to absorb hydrogen, and the hydrogen is desorbed at 45° C.; and the average particle size of the hydrogen storage alloy powder after the test of the 50 cycles (post-cycling particle size, $D_{50}$) is measured with a particle size distribution measuring device.

For application to hybrid vehicles, a high durability is required, and in order to maintain such a high durability, the pulverization residual rate (%) after 50 cycles must be 50% or more. By controlling the a-axis length and c-axis length for each range of ABx as described above, a hydrogen storage alloy that is inexpensive because the composition proportion (molar ratio) of Co is 0.35 or less, and satisfies a high durability required for a negative electrode active material of a battery for next-generation hybrid vehicles can be provided.

It is sufficient if the composition proportions of Ni, Mn, Al and Co are suitably controlled in the range of 5.2≦a+b+c+d≦5.5, preferably in the range of 5.25≦a+b+c+d or a+b+c+d≦5.45. In view of the feature of the low Co hydrogen storage alloy of the present invention, it is preferable that the alloy composition is adjusted so that the composition proportion (molar ratio) of Co is lowered, and the composition proportion (molar ratio) of Ni is raised, and further, the proportion of Mn can be in a predetermined range, and thereafter, the a-axis length and c-axis length of the crystal lattice are adjusted within a constant range by controlling the manufacturing conditions. It is therefore preferable that the composition proportions (molar ratios) of Co and Ni are determined, and then the alloy composition is determined by changing the composition proportions of Mn and Al to adjust ABx so that the composition proportion of Mn is in a predetermined range.

The proportion (d) of Co can be controlled in the range of 0<d≦0.35, preferably 0<d≦0.3, and more preferably 0<d≦0.2. If it is in the range of 0<d≦0.35, hydrogen storage properties or pulverization performance do not get deteriorated, and the advantage of cost reduction can be fully enjoyed.

The proportion (a) of Ni can be controlled in the range of 4.0≦a≦4.7, preferably 4.1≦a≦4.6, and more preferably 4.2≦a≦4.5. If it is in the range of 4.0≦a≦4.7, sufficient drain (power) performance can be obtained without affecting pulverization performance or life performance.

The proportion (b) of Mn can be controlled in the range of 0.3≦b≦0.65, preferably 0.35≦b≦0.60, and more preferably 0.4≦b≦0.55. Since the proportion of Mn is also an important factor in the alloy of the present invention, unless the proportion of Mn is controlled in the range of 0.3≦b≦0.65, it is difficult to secure the pulverization residual rate after 50 cycles at 50% or more.

The proportion (c) of Al can be controlled in the range of 0.2≦c≦0.5, preferably 0.3≦c≦0.5, and more preferably 0.3≦c≦0.45. If it is in the range of 0.2≦c≦0.5, there is small effect of deteriorating the energy efficiency in charge and discharge is reduced due to excessive plateau pressure, and also small effect of lowering the hydrogen storage capacity.

The proportion (e) of Fe can be controlled in the range of 0<e≦0.11, preferably 0.001<e≦0.11, and more preferably 0.002<e≦0.11. If it is in the range of 0<e≦0.11, there is small effect of lowering activity, and also the pulverization performance can be improved.

In the above-described composition, "Mm" is Misch metal, which contains a mixture of rare earth elements, such as La, Ce, Pr, Nd and Sm. For example, it includes rare earth elements composed of Ce (40% to 50%), La (20% to 40%), Pr and Nd as main components. The content of La in Mm is 15% to 30% by weight, preferably 18% to 30% by weight in a hydrogen storage alloy.

(Method for Manufacturing Low Co Hydrogen Storage Alloy)

Although the method for manufacturing the low Co hydrogen storage alloy of the present invention is not specifically limited, a hydrogen storage alloy can be manufactured by weighing and mixing every material for the hydrogen storage alloy so as to be an alloy composition represented by the general formula $MmNi_aMn_bAl_cCo_d$, where 4.0≦a≦4.7, 0.3≦b≦0.65, 0.2≦c≦0.5, 0<d≦0.35, 5.2≦a+b+c+d≦5.5, or a general formula $MmNi_aMn_bAl_cCo_dFe_e$, where Mm is a Misch metal, 4.0≦a≦4.7, 0.3≦b≦0.65, 0.2≦c≦0.5, 0<d≦0.35, 0<e≦0.11, 5.2≦a+b+c+d+e≦5.5, and controlling the manufacturing method and manufacturing conditions so that both the a-axis length and c-axis length of the crystal lattice are in a predetermined range.

For example, a hydrogen storage alloy can be manufactured by weighing and mixing materials for the hydrogen storage alloy, casting the mixture, and carrying out heat treatment. At this time, the a-axis length and c-axis length of the crystal lattice can be adjusted in a predetermined range by suitably selecting and controlling manufacturing conditions, such as casting conditions (casting method, casting temperature, cooling rate, etc.) and heat-treatment conditions, according to the alloy composition. In general, the c-axis length of the crystal lattice can be increased by increasing the cooling rate in casting, and the c-axis length of the crystal lattice can also be increase by raising the heat-treatment temperature. However, since the c-axis length of the crystal lattice in some alloy species is increase even if the heat-treatment temperature is low, these must be suitably controlled according to the alloy species.

In order to adjust both the a-axis length and c-axis length of the crystal lattice in a predetermined range, uniform crystal growth is one of the important factors. For homogenization of crystals, in addition to heat treatment, it is considered effective to control the particle sizes of the alloy powder by classifying the alloy before heat treatment, for example, as disclosed in Japanese Patent Application Laid-Open No. 2002-212601. Therefore, such method can be adopted as one of the methods for adjusting the a-axis length and c-axis length of the crystal lattice within a desired range.

Cast molding is preferable as the casting method, for example, a twin-roll method (specifically, refer to Japanese Patent Application No. 2002-299136, paragraph [0013] to [0016]), or other casting methods can also be used for manufacture.

Here, an example of the manufacturing methods using mold casting will be described.

First, materials for a hydrogen storage alloy are weighed and mixed so as to provide a desired alloy composition, and the materials for the hydrogen storage alloy are melted into a molten metal using a high-frequency melting furnace by induction heating. This molten metal of 1350° C. to 1550° C. is poured into a mold, for example, a water-cooling mold to cast the hydrogen storage alloy at, and is cooled at a predetermined cooling rate (predetermined quantity of cooling water). The temperature of the molten metal is 1200° C. to 1450° C. The casting temperature used here is the temperature of the molten metal in a crucible when casting is started, and the temperature of the molten metal is the temperature at the pouring port of the mold (temperature prior to casting).

Next, the obtained hydrogen storage alloy is subjected to a heat treatment in an inert-gas atmosphere, for example, in argon gas. The heat-treatment condition is preferably at 1040° C. to 1080° C. for 3 to 6 hours.

(Use of Low Co Hydrogen Storage Alloy)

The obtained hydrogen storage alloy (ingot) can be used as negative electrode active material for various batteries after being formed into hydrogen storage alloy powder of a required particle size by coarse grinding and fine grinding, and being subjected to a suitable surface treatment by coating alloy surfaces with metal materials or polymeric resins, or surface treatment with acid or alkali.

For a negative electrode for batteries, a hydrogen storage alloy negative electrode can be manufactured by mixing a binder or electrically conductive additive to the negative electrode active material and molding by a method already known.

The hydrogen storage alloy negative electrode obtained as described above can be used for a secondary cell, as well as a primary cell (including a fuel cell). For example, a nickel-MH (metal hydride) secondary cell can be constituted of a positive electrode using nickel hydroxide as an active material, an electrolyte consisting of an aqueous solution of an alkali, and a separator; and can be used as power sources for electric vehicles, hybrid vehicles, various small or portable electrical appliances, electric tools and the like. Among all, the low Co hydrogen storage alloy of the present invention is particularly suitable as the negative electrode active material for batteries of next-generation electric vehicles and hybrid vehicles that require low price, high output and high durability.

The use for heat pumps, the storage of natural energy, such as solar and wind energies, hydrogen storage, actuators and the like is also feasible.

EXAMPLES

The present invention will be specifically described on the basis of examples.

(Preparation of Samples)

Alloys were obtained by weighing and mixing each of hydrogen storage alloy materials so as to have alloy compositions shown in Table 1, feeding the mixture in a crucible into a high-frequency melting furnace and securing the crucible, evacuating it to $10^{-4}$ Torr or less, then heating and melting the mixture in an argon gas atmosphere and pouring into water-cooled copper mold, casting at casting temperature shown in Table 2, and cooling by quantities shown in Table 2 of cooling water. Furthermore, the alloys were subjected to heat treatment in an argon atmosphere at 1060° C. for 6 hours to obtain Samples 1 to 33 (hydrogen storage alloys in an ingot form).

TABLE 1

|  | Mm | Al | Mn | Co | Ni | Cu | Fe | ABx | La/wt % | Ce/wt % |
|---|---|---|---|---|---|---|---|---|---|---|
| Sample 1 | 1 | 0.30 | 0.45 | 0.10 | 4.45 | — | — | 5.30 | 26 | 1-10 |
| Sample 2 | 1 | 0.35 | 0.45 | 0.10 | 4.40 | — | — | 5.30 | 24 | 5-10 |
| Sample 3 | 1 | 0.40 | 0.45 | 0.10 | 4.35 | — | — | 5.30 | 24 | 5-10 |
| Sample 4 | 1 | 0.30 | 0.45 | 0.10 | 4.45 | — | — | 5.30 | 24 | 5-10 |
| Sample 5 | 1 | 0.40 | 0.50 | 0.10 | 4.30 | — | — | 5.30 | 19 | 5-10 |
| Sample 6 | 1 | 0.35 | 0.55 | 0.10 | 4.30 | — | — | 5.30 | 16 | 10-15 |
| Sample 7 | 1 | 0.40 | 0.55 | 0.10 | 4.25 | — | — | 5.30 | 16 | 10-15 |
| Sample 8 | 1 | 0.45 | 0.55 | 0.10 | 4.20 | — | — | 5.30 | 14 | 10-15 |
| Sample 9 | 1 | 0.35 | 0.40 | 0.10 | 4.45 | — | — | 5.30 | 26 | 1-10 |
| Sample 10 | 1 | 0.35 | 0.60 | 0.10 | 4.25 | — | — | 5.30 | 26 | 10-15 |
| Sample 11 | 1 | 0.45 | 0.40 | 0.10 | 4.35 | — | — | 5.30 | 24 | 5-10 |
| Sample 12 | 0.991 | 0.35 | 0.50 | 0.10 | 4.35 | — | — | 5.35 | 20 | 5-10 |
| Sample 13 | 1 | 0.30 | 0.45 | 0.10 | 4.45 | — | — | 5.30 | 23 | 1-10 |
| Sample 14 | 1 | 0.35 | 0.45 | 0.10 | 4.40 | — | — | 5.30 | 22 | 5-10 |
| Sample 15 | 1 | 0.40 | 0.45 | 0.10 | 4.35 | — | — | 5.30 | 22 | 5-10 |
| Sample 16 | 1 | 0.30 | 0.50 | 0.10 | 4.40 | — | — | 5.30 | 21 | 5-10 |
| Sample 17 | 1 | 0.37 | 0.52 | 0.10 | 4.31 | — | — | 5.30 | 20 | 5-10 |

TABLE 1-continued

|  | Mm | Al | Mn | Co | Ni | Cu | Fe | ABx | La/wt % | Ce/wt % |
|---|---|---|---|---|---|---|---|---|---|---|
| Sample 18 | 1 | 0.37 | 0.47 | 0.10 | 4.36 | — | — | 5.30 | 22 | 5-10 |
| Sample 19 | 1 | 0.33 | 0.47 | 0.10 | 4.40 | — | — | 5.30 | 22 | 5-10 |
| Sample 20 | 1 | 0.40 | 0.52 | 0.10 | 4.28 | — | — | 5.30 | 22 | 5-10 |
| Sample 21 | 1 | 0.40 | 0.47 | 0.10 | 4.33 | — | — | 5.30 | 20 | 5-10 |
| Sample 22 | 1 | 0.35 | 0.50 | 0.10 | 4.35 | — | — | 5.30 | 20 | 5-10 |
| Sample 23 | 1.006 | 0.35 | 0.50 | 0.10 | 4.35 | — | — | 5.27 | 20 | 5-10 |
| Sample 24 | 0.994 | 0.35 | 0.50 | 0.10 | 4.35 | — | — | 5.33 | 20 | 5-10 |
| Sample 25 | 0.987 | 0.35 | 0.50 | 0.10 | 4.35 | — | — | 5.37 | 20 | 5-10 |
| Sample 26 | 1 | 0.35 | 0.35 | 0.10 | 4.50 | — | — | 5.30 | 24 | 1-10 |
| Sample 27 | 1 | 0.20 | 0.65 | 0.10 | 4.35 | — | — | 5.30 | 17 | 5-15 |
| Sample 28 | 1 | 0.30 | 0.40 | 0.75 | 3.55 | — | — | 5.00 | 11 | 10-20 |
| Sample 29 | 1 | 0.30 | 0.45 | 0.40 | 3.95 | 0.1 | — | 5.20 | 19 | 5-15 |
| Sample 30 | 1 | 0.30 | 0.50 | 0.30 | 4.20 | — | — | 5.30 | 20 | 5-15 |
| Sample 31 | 1 | 0.35 | 0.50 | 0.10 | 4.375 | — | 0.025 | 5.35 | 20 | 5-10 |
| Sample 32 | 1 | 0.35 | 0.50 | 0.10 | 4.35 | — | 0.05 | 5.35 | 20 | 5-10 |
| Sample 33 | 1 | 0.35 | 0.50 | 0.10 | 4.29 | — | 0.11 | 5.35 | 20 | 5-10 |

* Other rare earth metals are used in a suitable amount.

(Characteristics and Properties Evaluation)

For Samples 1 to 33 obtained as described above, various property values and various characteristic values were measured using a method described below, and the results were shown in Table 2.

<a-Axis Length> <c-Axis Length>

A hydrogen storage alloy (ingot) was ground and screened to classify the particles into −20 μm (particle sizes that passed through a screen of a diameter of 20 μm), 20 μm to 53 μm (particle sizes that did not pass through a screen of a diameter of 20 μm, but passed through a screen of a diameter of 53 μm), and 53 μm or more (particle sizes that did not pass through a screen of a diameter of 53 μm), of which the powder of −20 μm was filled in a glass holder to serve to a powder X-ray diffractometer (XRD manufactured by RIGAKU). Measurement was carried out using CuK α-line at a scanning speed of 1°/min and an angle of 100° to 150°, the lattice constant was refined using an error function measuring method (Wilson & Pike method), and the a-axis length (pm) and c-axis length (pm) were calculated. The values of the calculated a-axis length and c-axis length have variations of ±0.1 pm.

Peaks used for refining were as follows:

Indexed peak by a Miller index (303) present in the vicinity of 100° to 104°

Indexed peak by a Miller index (321) present in the vicinity of 105° to 106°

Indexed peak by a Miller index (402) present in the vicinity of 106° to 107°

Indexed peak by a Miller index (411) present in the vicinity of 110° to 114°

Indexed peak by a Miller index (313) present in the vicinity of 116° to 118°

Indexed peak by a Miller index (412) present in the vicinity of 126° to 129°

Indexed peak by a Miller index (501) present in the vicinity of 129° to 132°

Indexed peak by a Miller index (331) present in the vicinity of 139° to 142°

<Pulverization Residual Rate (10−D/%)(50−D/%)>

Hydrogen storage alloy powder was produced by grinding a hydrogen storage alloy (ingot), screening to select particles in the particle size range between 20 μm and 53 μm. The average particle size ($D_{50}$) of the hydrogen storage alloy powder was measured using a particle size distribution measuring device (Microtrac, manufactured by NIKKISO Co., Ltd.), and this was used as pre-cycling particle size. Next, 2 g of the hydrogen storage alloy powder was weighed and the sample was placed in a PCT holder, and after the surface of the MH alloy was cleaned twice under hydrogen pressure of 1.75 MPa, and activated twice by introducing hydrogen of a pressure of 3 MPa.

After activation treatment, a cycle test was repeated 10 times or 50 times (temperature condition: 45° C.) such that hydrogen gas of a pressure of 3 MPa was introduced and absorbed on 2.0 g of the hydrogen storage alloy powder using a PCT device (automatic Sievert's system, manufactured by Suzukishokan Co. Ltd.), and hydrogen was then desorbed at 45° C.

Thereafter, the hydrogen storage alloy powder was recovered, the average particle size ($D_{50}$) was measured again, and this was used as post-cycling particle size. Both the average particle sizes ($D_{50}$) were used to calculate the pulverization residual rate (%) after 10 cycles and the pulverization residual rate (%) after 50 cycles using the following equation:

Pulverization residual rate (%)=(Post-cycling particle size/pre-cycling particle size)×100

<PCT Capacity (H/M)>

The hydrogen storage capacity (H/M) under the condition of 0.5 MPa was obtained when a PCT curve was measured at 45° C. using a PCT device (automatic Sievert's system, manufactured by Suzukishokan Co. Ltd.).

<Plateau Pressure (PH2/MPa)>

The equilibrium hydrogen pressure (MPa) at H/M 0.5 was obtained when a PCT curve was measured at 45° C. using a PCT device (automatic Sievert's system, manufactured by Suzukishokan Co. Ltd.).

<Fabrication of Electrode Cell>

To nickel powder (conductive material) and polyethylene powder (binder), the hydrogen storage alloy powder whose average particle size had been adjusted to 45 μm was mixed to obtain the mixture of 3.12 g in total. The obtained mixed powder was compressed to produce pellets of a diameter of 15 mm and a thickness of 1.8 mm, sintered in vacuum at 150° C. for 1 hour for sintering to produce a pellet electrode.

The pellet electrode was used as a negative electrode, which was sandwiched by positive electrodes (sintered nickel hydroxide) having a sufficient capacity through separators (manufactured by Japan Vilene Co. Ltd.), and immersed in an aqueous solution of KOH having a specific gravity of 1.30 to fabricate an open-type test cell.

<Initial Capacity (1∞/mAh/g)> <20-Cycle Capacity (20∞/mAh/g)>

The above-described open-type test cell was connected to a charge-discharge apparatus (charge-discharge tester manufactured by HOKUTO), and charge and discharge were performed under the conditions of charge: 0.2 C×6 hours, and discharge: 0.2 C×0.7 V cut, at 25° C. The discharge capacity at 1st cycle (mAh/g) was taken as the initial capacity to be an index representing the initial activity. The discharge capacity at 20th cycle (mAh/g) was taken as the 20-cycle capacity.

<21st Cycle Capacity at 0° C. (0° C., 1 C Cap/mAh/g)>
<Pulse>

After measuring the 20-cycle initial capacity (mAh/g) in the above-described cycle test, 21 st cycle capacity (mAh/g) when the open-type test cell was charged at 0° C. and 0.2 C×6 hours, and discharged at 1 C was measured. It showed that the larger the capacity, the better the low-temperature performance.

After measuring the 21st cycle capacity, the voltage value (V) of 10 S, when the open-type test cell was charged at 0.2 C×6 hours; discharged at 0.2 C×2.5 hours; allowed to stand for 30 minutes; and then discharged at 2 C, was taken as a pulse. This becomes an index to indicate that the higher the voltage, the better the drain (power) performance at low temperatures.

<Activity>

The above-described open-type test cell was connected to a charge-discharge apparatus (charge-discharge tester manufactured by HOKUTO), and the cell was placed in a temperature-adjustable constant-temperature bath (manufactured by YAMATO). The capacity after conducting 3 cycles of charge and discharge at 25° C. under the conditions of charge: 0.2 C×6 hours, and discharge: 0.2 C–0.7 V cut, and charging at 0.2 C×6 hours at 25° C., the temperature of the constant-temperature bath was switched to 0° C., and discharging at 1 C–0.7 V cut, was taken as the 4th cycle capacity (mAh/g).

Thereafter, the capacity after charging at 1 C×1 hour 12 minutes, and discharging at 1 C–0.7 V cut, was taken as the 5th cycle capacity (mAh/g).

Similar tests were conducted for 15th to 17th cycles, and capacity at each cycle (15th to 17th cycles) was measured.

Then, the activity (%) was calculated using the following equation:

$$\text{Activity (\%)} = \text{5th cycle capacity} / \text{17th cycle capacity} \times 100$$

TABLE 2

| | Manufacturing conditions | | | Properties | | | PCT | | | | | Single electrode 0° C., 1 C, | | |
|---|---|---|---|---|---|---|---|---|---|---|---|---|---|---|
| | Casting temperature ° C. | Heat treatment conditions ° C. × h | Cooling water quantity l/min | a-Axis pm | c-Axis pm | H/M | PH2 MPa | 10-D % | 50-D % | 1 ∞ mAh/g | 200 ∞ mAh/g | Cap mAh/g | Activity % | Pulse V |
| Sample 1 | 1438 | 1060 × 3 | 150 | 502.2 | 405.9 | 0.861 | 0.045 | 89 | 62 | 257 | 311 | 269 | 94 | 1.19 |
| Sample 2 | 1430 | 1060 × 3 | 150 | 502.1 | 406.3 | 0.835 | 0.036 | 91 | 75 | 274 | 308 | 260 | 96 | 1.17 |
| Sample 3 | 1430 | 1060 × 3 | 150 | 501.6 | 406.6 | 0.819 | 0.034 | 86 | 63 | 277 | 308 | 255 | 96 | 1.18 |
| Sample 4 | 1453 | 1060 × 3 | 150 | 502.1 | 406.4 | 0.852 | 0.037 | 86 | 62 | 268 | 312 | 261 | 94 | 1.19 |
| Sample 5 | 1436 | 1060 × 3 | 150 | 500.9 | 407.2 | 0.800 | 0.037 | 92 | 68 | 267 | 302 | 265 | 97 | 1.19 |
| Sample 6 | 1433 | 1060 × 3 | 150 | 500.0 | 407.0 | 0.802 | 0.048 | 80 | 51 | 265 | 293 | 244 | 98 | 1.18 |
| Sample 7 | 1432 | 1060 × 3 | 150 | 499.7 | 407.1 | 0.799 | 0.047 | 74 | 42 | 264 | 295 | 248 | 98 | 1.18 |
| Sample 8 | 1436 | 1060 × 3 | 150 | 500.0 | 407.6 | 0.787 | 0.033 | 64 | 45 | 257 | 287 | 230 | 100 | 1.15 |
| Sample 9 | 1436 | 1060 × 3 | 150 | 502.4 | 405.9 | 0.843 | 0.039 | 88 | 59 | 275 | 312 | 266 | 97 | 1.17 |
| Sample 10 | 1440 | 1060 × 3 | 150 | 499.7 | 407.4 | 0.801 | 0.047 | 64 | 36 | 265 | 295 | 244 | 100 | 1.14 |
| Sample 11 | 1442 | 1060 × 3 | 150 | 502.3 | 406.4 | 0.820 | 0.027 | 92 | 66 | 262 | 301 | 247 | 99 | 1.15 |
| Sample 12 | 1430 | 1060 × 3 | 150 | 500.8 | 406.9 | 0.809 | 0.050 | 90 | 67 | 227 | 301 | 239 | 90 | 1.14 |
| Sample 13 | 1432 | 1060 × 3 | 150 | 501.2 | 406.1 | 0.843 | 0.062 | 84 | 60 | 274 | 303 | 250 | 92 | 1.16 |
| Sample 14 | 1430 | 1060 × 3 | 150 | 501.2 | 406.3 | 0.828 | 0.046 | 90 | 68 | 286 | 305 | 251 | 97 | 1.16 |
| Sample 15 | 1430 | 1060 × 3 | 150 | 501.9 | 406.7 | 0.823 | 0.033 | 87 | 64 | 264 | 308 | 255 | 97 | 1.16 |
| Sample 16 | 1430 | 1060 × 3 | 150 | 501.2 | 406.6 | 0.835 | 0.053 | 89 | 64 | 279 | 305 | 249 | 89 | 1.15 |
| Sample 17 | 1446 | 1060 × 3 | 150 | 501.3 | 406.6 | 0.817 | 0.036 | 91 | 72 | 264 | 307 | 260 | 94 | 1.16 |
| Sample 18 | 1430 | 1060 × 3 | 150 | 501.5 | 406.7 | 0.826 | 0.035 | 90 | 68 | 280 | 304 | 259 | 96 | 1.17 |
| Sample 19 | 1433 | 1060 × 3 | 150 | 501.3 | 406.6 | 0.826 | 0.047 | 90 | 68 | 279 | 305 | 243 | 91 | 1.16 |
| Sample 20 | 1435 | 1060 × 3 | 150 | 502.3 | 407.2 | 0.826 | 0.020 | 93 | 66 | 272 | 306 | 265 | 99 | 1.17 |
| Sample 21 | 1432 | 1060 × 3 | 150 | 501.9 | 406.9 | 0.828 | 0.028 | 88 | 64 | 263 | 303 | 241 | 99 | 1.16 |
| Sample 22 | 1430 | 1060 × 3 | 150 | 500.9 | 407.1 | 0.814 | 0.046 | 93 | 74 | 269 | 306 | 267 | 92 | 1.17 |
| Sample 23 | 1436 | 1060 × 3 | 150 | 501.3 | 406.8 | 0.824 | 0.042 | 88 | 63 | 269 | 307 | 256 | 97 | 1.17 |
| Sample 24 | 1434 | 1060 × 3 | 150 | 500.8 | 407.1 | 0.809 | 0.048 | 92 | 69 | 260 | 303 | 249 | 96 | 1.17 |
| Sample 25 | 1438 | 1060 × 3 | 150 | 500.8 | 407.3 | 0.803 | 0.053 | 88 | 65 | 262 | 303 | 262 | 95 | 1.18 |
| Sample 26 | 1432 | 1060 × 3 | 150 | 501.5 | 405.3 | 0.845 | 0.063 | 81 | 47 | 285 | 302 | 275 | 96 | 1.19 |
| Sample 27 | 1430 | 1060 × 3 | 150 | 500.3 | 405.7 | 0.836 | 0.061 | 64 | 42 | 282 | 303 | 278 | 97 | 1.20 |
| Sample 28 | 1430 | 1060 × 3 | 150 | 499.4 | 405.7 | 0.830 | 0.055 | 96 | 86 | 257 | 312 | 201 | 36 | 1.11 |
| Sample 29 | 1480 | 1060 × 3 | 150 | 501.0 | 406.6 | 0.800 | 0.056 | 97 | 80 | 254 | 302 | 179 | 28 | 1.13 |
| Sample 30 | 1430 | 1060 × 3 | 150 | 501.0 | 406.5 | 0.810 | 0.055 | 93 | 84 | 285 | 310 | 262 | 75 | 1.16 |
| Sample 31 | 1430 | 1060 × 3 | 160 | 501.6 | 407.0 | 0.806 | 0.046 | 94 | 78 | 282 | 303 | 245 | 91 | 1.17 |
| Sample 32 | 1430 | 1060 × 3 | 170 | 501.5 | 407.2 | 0.803 | 0.046 | 95 | 81 | 281 | 302 | 231 | 90 | 1.17 |
| Sample 33 | 1430 | 1060 × 3 | 180 | 501.3 | 408.2 | 0.801 | 0.047 | 98 | 88 | 279 | 301 | 200 | 88 | 1.17 |

FIG. 1 is a graph wherein a-axis lengths and c-axis lengths of Samples 1 to 30 are plotted in the coordinate consisting of the horizontal axis: a-axis length and the vertical axis: c-axis length.

It was known from the results of FIG. 1 and Table 2 that when the a-axis length and c-axis length were within predetermined ranges, all of activity, drain (power) performance and life performance were improved. Above all, Samples 2, 17, 22 and 24 were evaluated as being excellent especially in activity, drain (power) performance and life performance. When Samples 31 to 33 were noted, it was found that all of activity, drain (power) performance and life performance were improved, and life performance was particularly excellent, even with iron (Fe) contained. Furthermore, it was found that when the quantity of cooling water was increased, specifically when the cooling rate was raised, there was tendency for the c-axis length to increase and for the life performance to improve.

Figure 2:
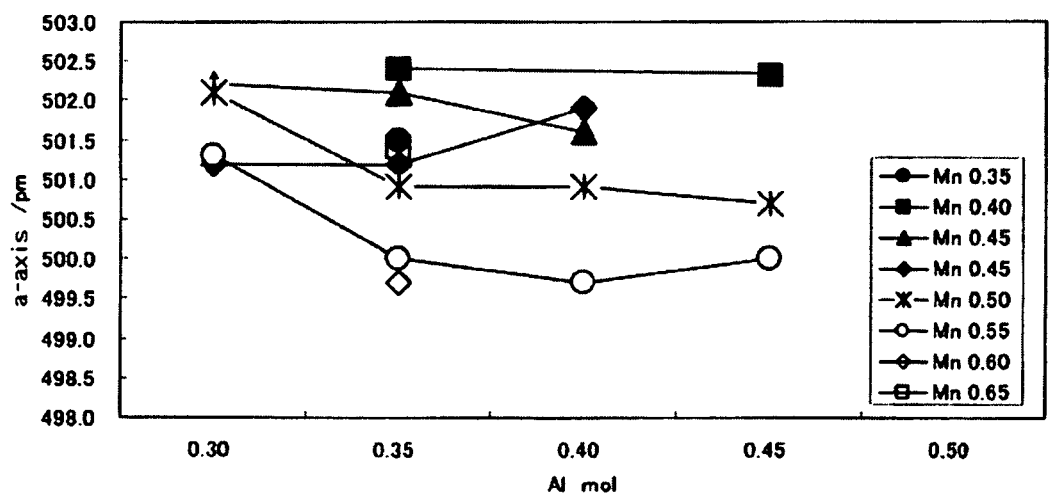
FIG. 2 is a graph wherein samples 1 to 30 are classified according to Mn proportions (molar ratios), and the relationship between Al proportions (horizontal axis) and a-axis lengths (vertical axis) in each Mn proportion is plotted.
Figure 3:
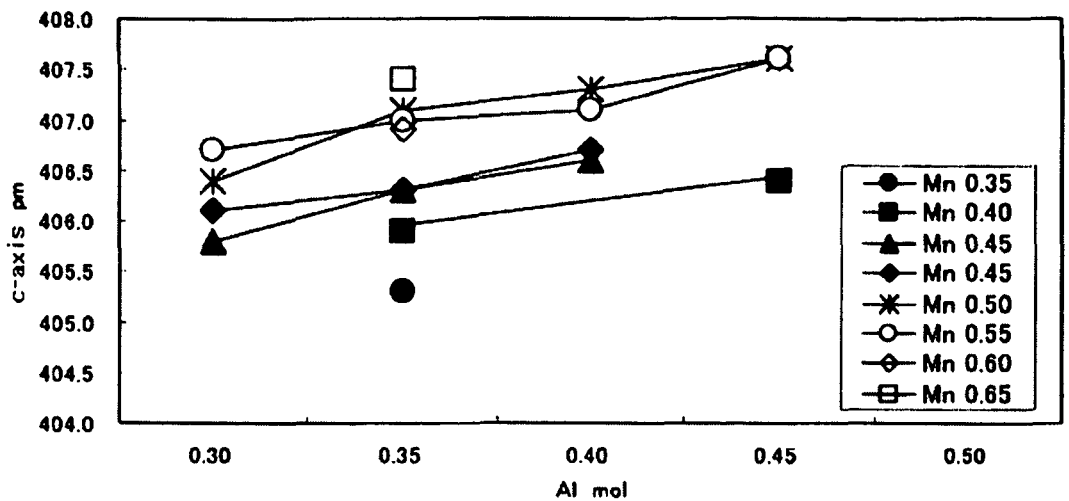
FIG. 3 is a graph wherein samples 1 to 30 are classified according to Mn proportions (molar ratios), and the relationship between Al proportions (horizontal axis) and c-axis lengths (vertical axis) in each Mn proportion is plotted.
Figure 4:
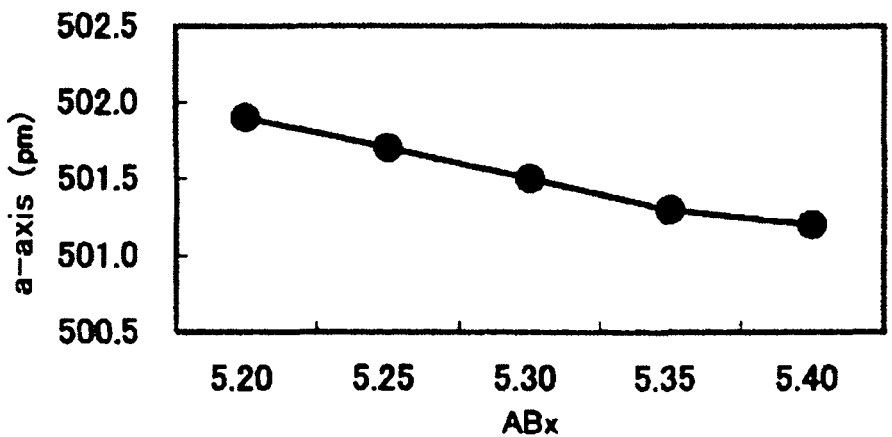
FIG. 4 is a graph wherein alloys of an ABx of 5.20 to 5.40 are produced by changing the Mm proportions (molar ratios) of the sample 26 having an Mn proportion (molar ratio) of 0.35 ($Ni_{4.50}Mn_{0.35}Al_{0.35}Co_{0.10}$), and the relationship between ABx (horizontal axis) and a-axis lengths (vertical axis) of the resulting alloys is shown.
Figure 5:
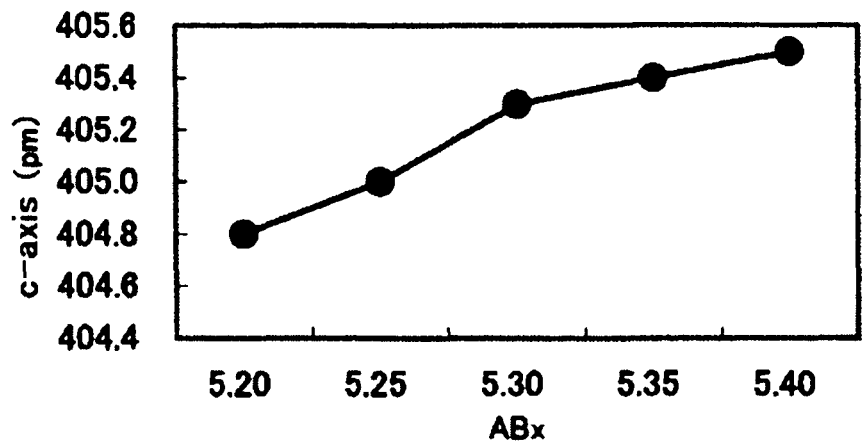
FIG. 5 is a graph showing the relationship between ABx (horizontal axis) and c-axis lengths (vertical axis) of the same alloys in FIG. 4.
Figure 6:
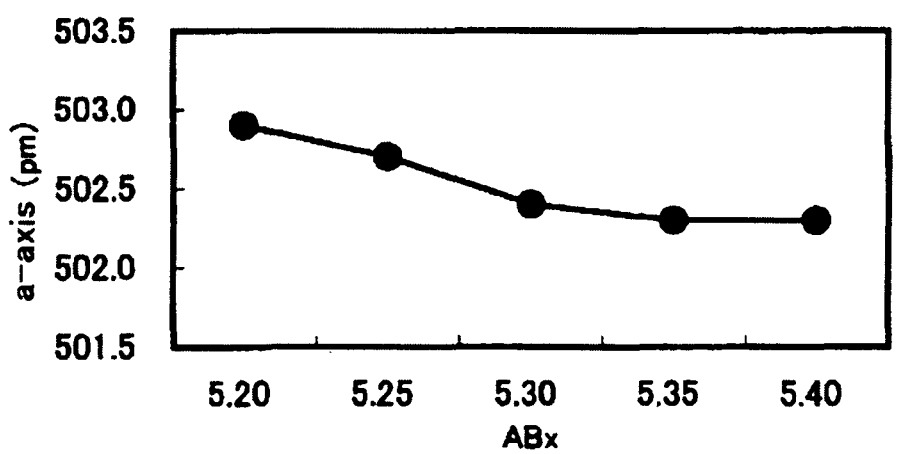
FIG. 6 is a graph wherein alloys of an ABx of 5.20 to 5.40 are produced by changing the Mm proportions (molar ratios) of the sample 9 having an Mn proportion (molar ratio) of 0.40 ($Ni_{4.45}Mn_{0.40}Al_{0.35}Co_{0.10}$), and the relationship between ABx (horizontal axis) and a-axis lengths (vertical axis) of the resulting alloys is shown.
Figure 7:
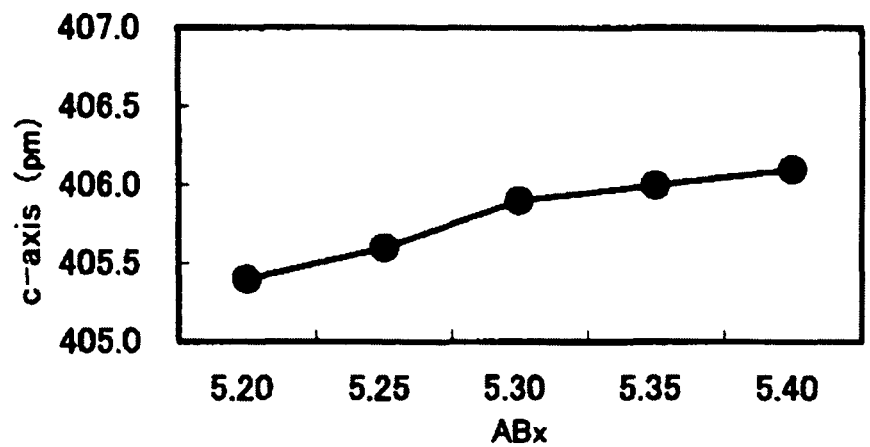
FIG. 7 is a graph showing the relationship between ABx (horizontal axis) and c-axis lengths (vertical axis) of the same alloys in FIG. 6.
Figure 8:
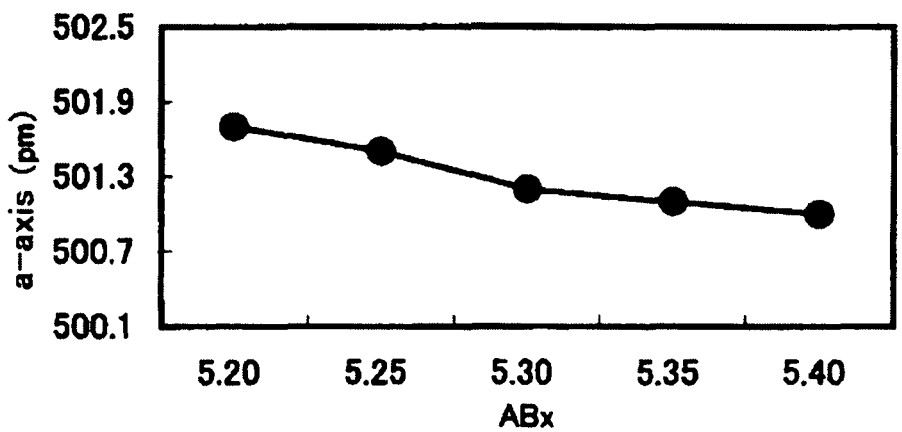
FIG. 8 is a graph wherein alloys of an ABx of 5.20 to 5.40 are produced by changing the Mm proportions (molar ratios) of the sample 14 having an Mn proportion (molar ratio) of 0.45 ($Ni_{4.40}Mn_{0.45}Al_{0.35}Co_{0.10}$), and the relationship between ABx (horizontal axis) and a-axis lengths (vertical axis) of the resulting alloys is shown.
Figure 9:
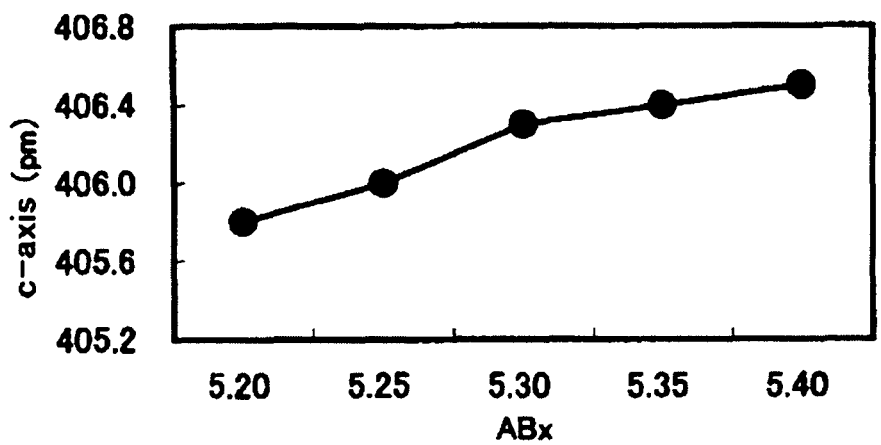
FIG. 9 is a graph showing the relationship between ABx (horizontal axis) and c-axis lengths (vertical axis) of the same alloys in FIG. 8.
Figure 10:
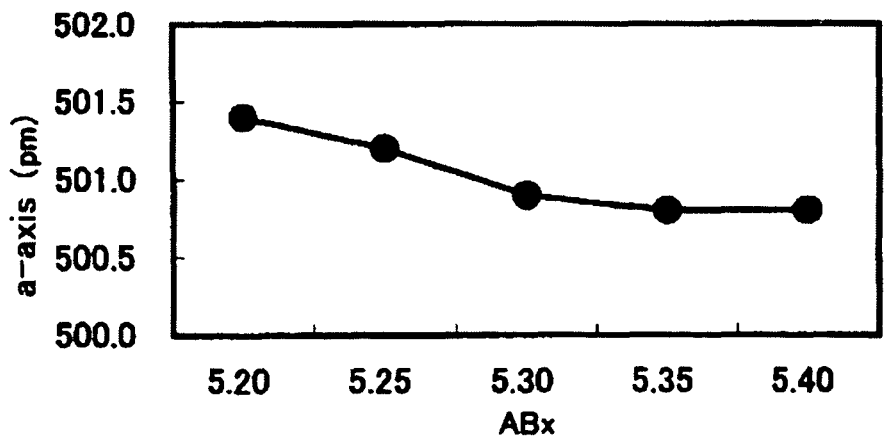
FIG. 10 is a graph wherein alloys of an ABx of 5.20 to 5.40 are produced by changing the Mm proportions (molar ratios) of the sample 22 having an Mn proportion (molar ratio) of 0.50 ($Ni_{4.35}Mn_{0.50}Al_{0.35}Co_{0.10}$), and the relationship between ABx (horizontal axis) and a-axis lengths (vertical axis) of the resulting alloys is shown.
Figure 11:
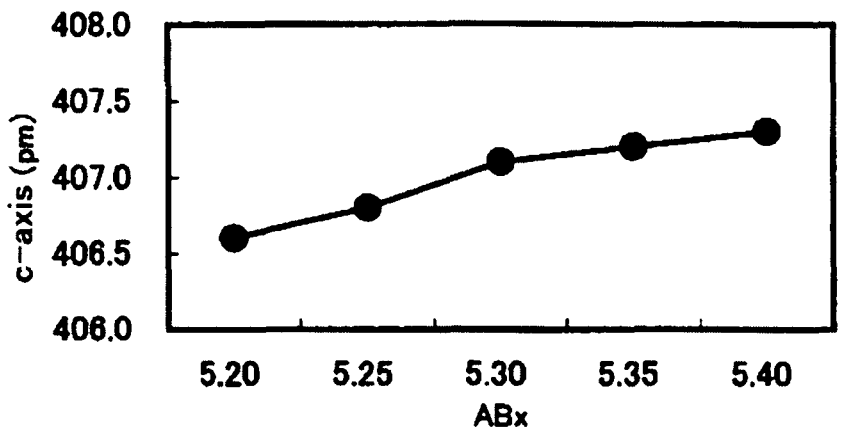
FIG. 11 is a graph showing the relationship between ABx (horizontal axis) and c-axis lengths (vertical axis) of the same alloys in FIG. 10.
Figure 12:
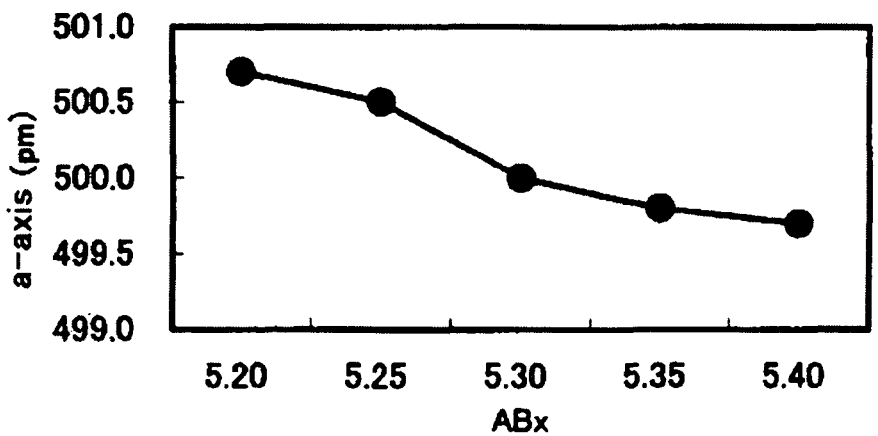
FIG. 12 is a graph wherein alloys of an ABx of 5.20 to 5.40 are produced by changing the Mm proportions (molar ratios) of the sample 6 having an Mn proportion (molar ratio) of 0.55 ($Ni_{4.30}Mn_{0.55}Al_{0.35}Co_{0.10}$), and the relationship between ABx (horizontal axis) and a-axis lengths (vertical axis) of the resulting alloys is shown.
Figure 13:
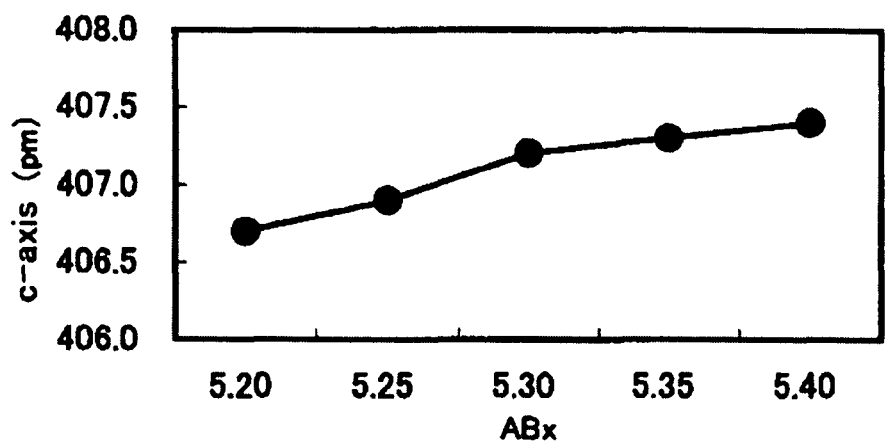
FIG. 13 is a graph showing the relationship between ABx (horizontal axis) and c-axis lengths (vertical axis) of the same alloys in FIG. 12.
Figure 14:
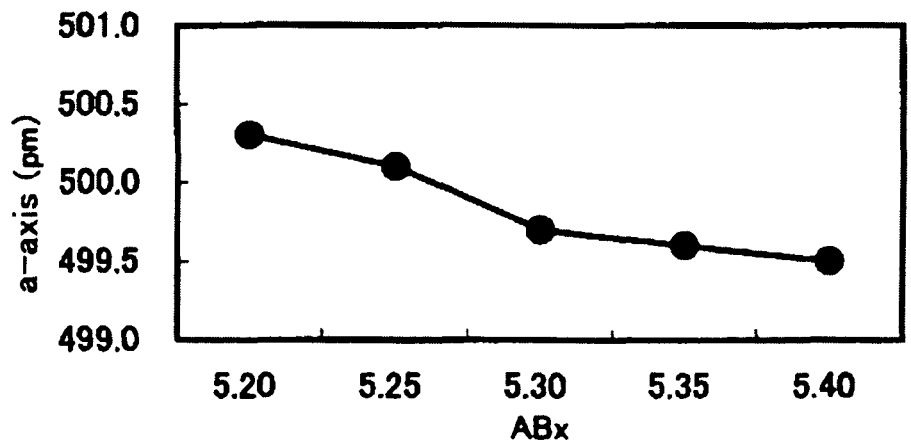
FIG. 14 is a graph wherein alloys of an ABx of 5.20 to 5.40 are produced by changing the Mm proportions (molar ratios) of the sample 10 having an Mn proportion (molar ratio) of 0.60 ($Ni_{4.25}Mn_{0.60}Al_{0.35}Co_{0.10}$), and the relationship between ABx (horizontal axis) and a-axis lengths (vertical axis) of the resulting alloys is shown.
Figure 15:
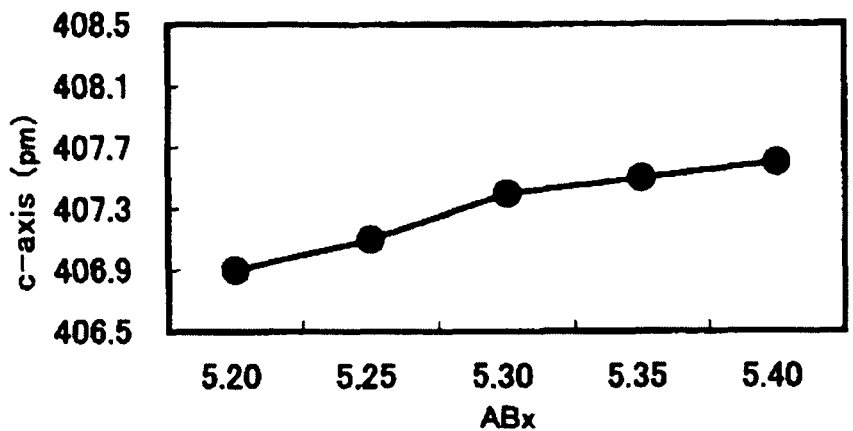
FIG. 15 is a graph showing the relationship between ABx (horizontal axis) and c-axis lengths (vertical axis) of the same alloys in FIG. 14.
Figure 16:
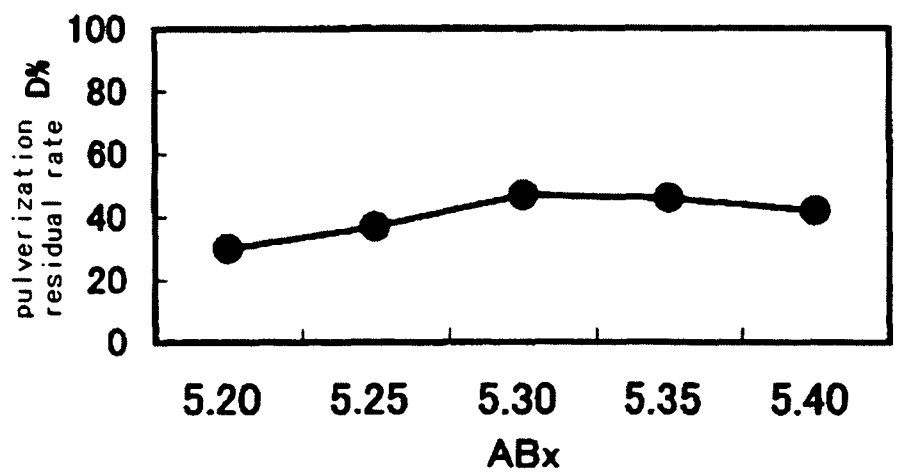
FIG. 16 is a graph showing the relationship between ABx (horizontal axis) and pulverization residual rate (vertical axis) of the same alloys in FIG. 4 after 50 cycles.
Figure 17:
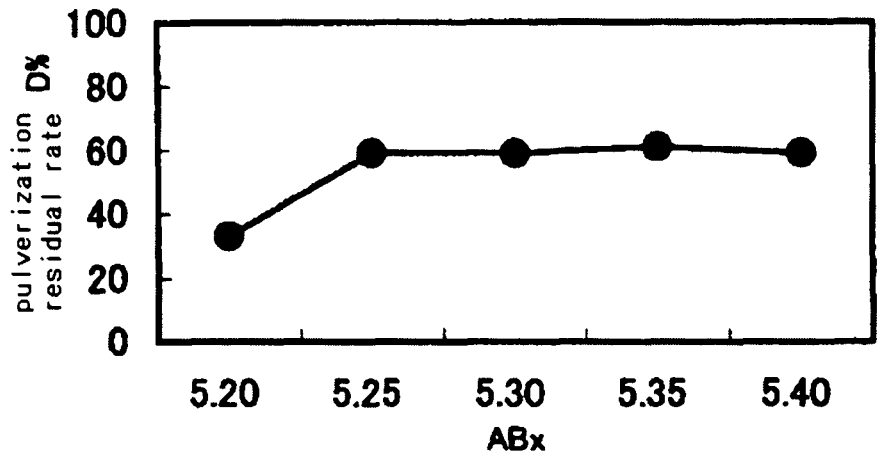
FIG. 17 is a graph showing the relationship between ABx (horizontal axis) and pulverization residual rate (vertical axis) of the same alloys in FIG. 6 after 50 cycles.
Figure 18:
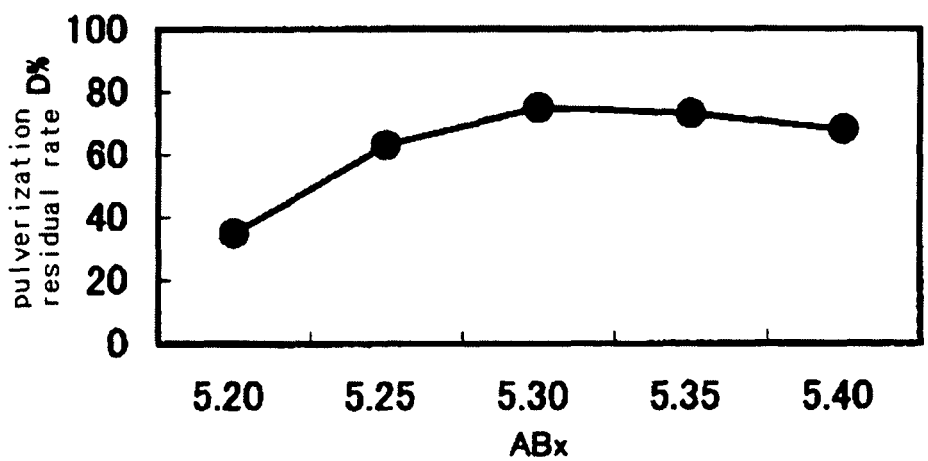
FIG. 18 is a graph showing the relationship between ABx (horizontal axis) and pulverization residual rate (vertical axis) of the same alloys in FIG. 8 after 50 cycles.
Figure 19:
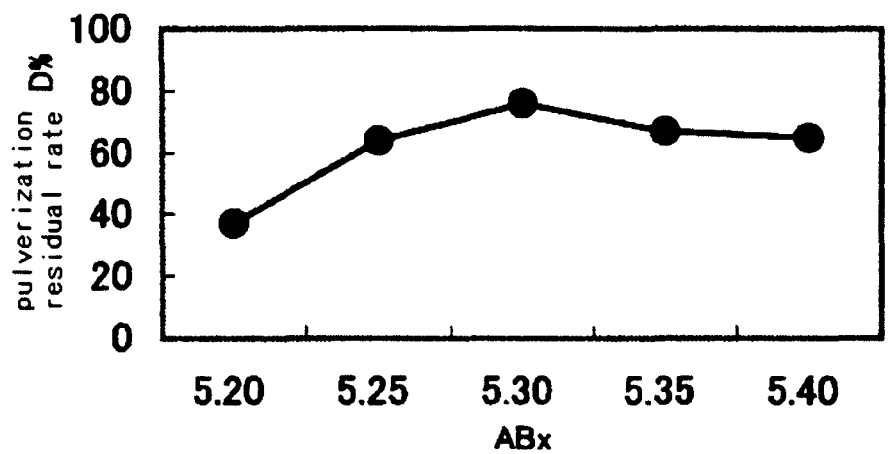
FIG. 19 is a graph showing the relationship between ABx (horizontal axis) and pulverization residual rate (vertical axis) of the same alloys in FIG. 10 after 50 cycles.
Figure 20:
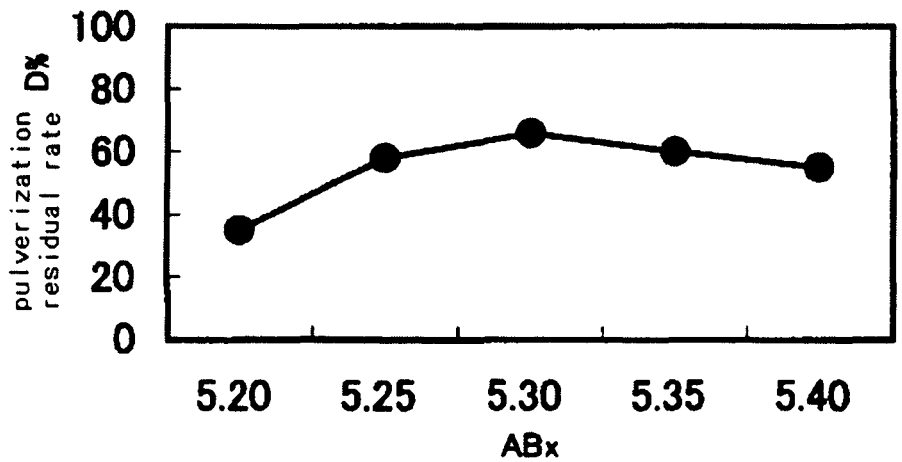
FIG. 20 is a graph showing the relationship between ABx (horizontal axis) and pulverization residual rate (vertical axis) of the same alloys in FIG. 12 after 50 cycles.
Figure 21:
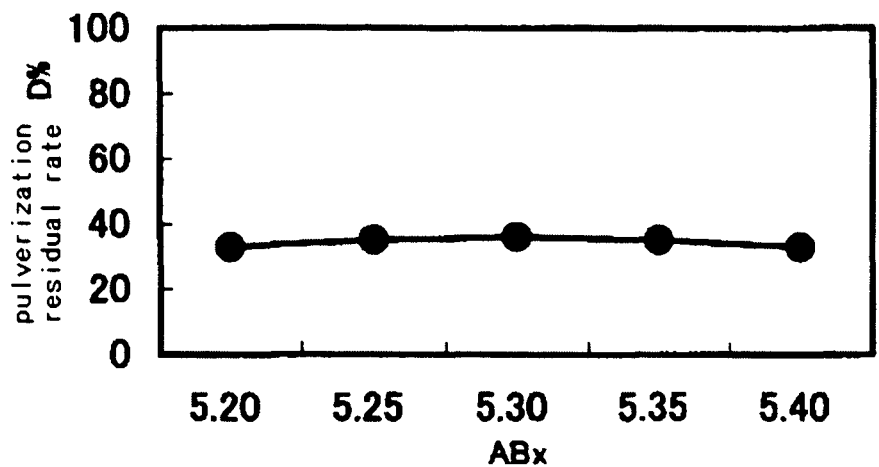
FIG. 21 is a graph showing the relationship between ABx (horizontal axis) and pulverization residual rate (vertical axis) of the same alloys in FIG. 14 after 50 cycles.

FIGS. 2 and 3 are graphs wherein Samples 1 to 30 are classified according to Mn proportions (molar ratio), and the relationship between the Al proportions (horizontal axis) and the a-axis length (vertical axis) or the c-axis length (vertical axis) for each Mn proportion is plotted.

FIGS. 4 to 21 and Tables 3 to 5 show relationships, where samples (Samples 6, 9, 10, 14, 22 and 26) having different Mn proportions (molar ratios) were selected from Sample 1 to 30; Mm proportions (molar ratios) in the alloy compositions of the selected samples were changed to produce alloys having ABx of 5.2 to 5.4 (where the manufacturing conditions were the same as in the selected samples), FIGS. 4 to 15 and Tables 3 and 4 show the relationship between ABx and the a-axis length (vertical axis) or the c-axis length (vertical axis) and FIGS. 16 to 21 and Table 5 show the relationship between ABx and the pulverization residual rate after 50 cycles, for each selected sample, in other words, each Mn proportion.

Thereby, it was found that there was correlation between ABx and the a-axis length or the c-axis length, and that when ABx was increased, the a-axis length tended to decrease and the c-axis length tended to increase.

TABLE 3

|  |  | ABx | | | | |
| --- | --- | --- | --- | --- | --- | --- |
|  |  | 5.20 | 5.25 | 5.30 | 5.35 | 5.40 |
| Mn0.35 | a-Axis | 501.9 | 501.7 | 501.5 | 501.3 | 501.2 |
| Mn0.40 | length | 502.9 | 502.7 | 502.4 | 502.3 | 502.3 |
| Mn0.45 |  | 501.7 | 501.5 | 501.2 | 501.1 | 501.0 |
| Mn0.50 |  | 501.4 | 501.2 | 500.9 | 500.8 | 500.8 |
| Mn0.55 |  | 500.7 | 500.5 | 500.0 | 499.8 | 499.7 |
| Mn0.60 |  | 500.3 | 500.1 | 499.7 | 499.6 | 499.5 |

TABLE 4

|  |  | ABx | | | | |
| --- | --- | --- | --- | --- | --- | --- |
|  |  | 5.20 | 5.25 | 5.30 | 5.35 | 5.40 |
| Mn0.35 | c-Axis | 404.8 | 405.0 | 405.3 | 405.4 | 405.5 |
| Mn0.40 | length | 405.4 | 405.6 | 405.9 | 406.0 | 406.1 |
| Mn0.45 |  | 405.8 | 406.0 | 406.3 | 406.4 | 406.5 |
| Mn0.50 |  | 406.6 | 406.8 | 407.1 | 407.2 | 407.3 |
| Mn0.55 |  | 406.7 | 406.9 | 407.0 | 407.3 | 407.4 |
| Mn0.60 |  | 406.9 | 407.1 | 407.4 | 407.5 | 407.6 |

TABLE 5

|  |  | ABx | | | | |
| --- | --- | --- | --- | --- | --- | --- |
|  |  | 5.20 | 5.25 | 5.30 | 5.35 | 5.40 |
| Mn0.35 | Pulverization | 30 | 37 | 47 | 46 | 42 |
| Mn0.40 | residual rate | 33 | 59 | 59 | 61 | 59 |
| Mn0.45 |  | 35 | 63 | 75 | 73 | 68 |
| Mn0.50 |  | 37 | 64 | 76 | 67 | 65 |
| Mn0.55 |  | 35 | 58 | 66 | 60 | 55 |
| Mn0.60 |  | 33 | 35 | 36 | 35 | 33 |

FIGS. 22 to 26 and Tables 6 to 9 are graphs showing the relationships between the a-axis length and the c-axis length in each ABx obtained by classifying Samples 1 to 30 according to ABx; and showing the regions having a pulverization residual rate after 50 cycles of 50% or more.

Figure 22:
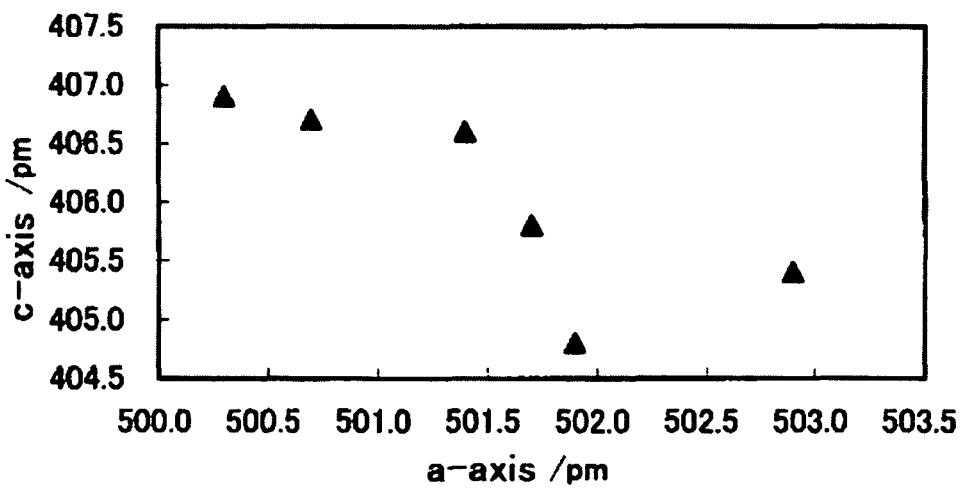
FIG. 22 is a graph wherein samples of $5.20 \leq ABx$ (a+b+c+d)<5.25 are plotted in coordinate axes consisting of a vertical axis (c-axis length) and a horizontal axis (a-axis length), and the region where pulverization residual rate after 50 cycles is 50% or more is shown. (However, since no regions where pulverization residual rate after 50 cycles is 50% or more exist in this graph, the region is not shown.).
Figure 23:
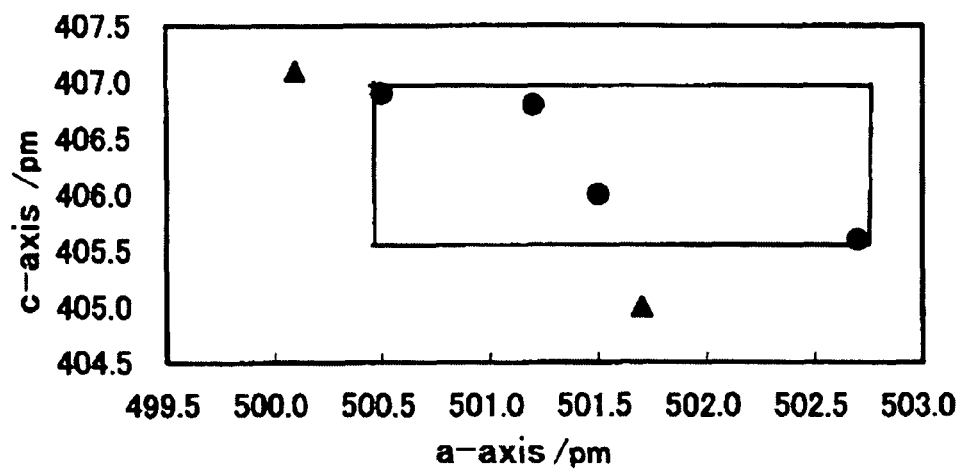
FIG. 23 is a graph wherein samples of $5.25 \leq ABx$ (a+b+c+d)<5.30 are plotted in coordinate axes consisting of a vertical axis (c-axis length) and a horizontal axis (a-axis length), and the region where pulverization residual rate after 50 cycles is 50% or more is shown.
Figure 24:
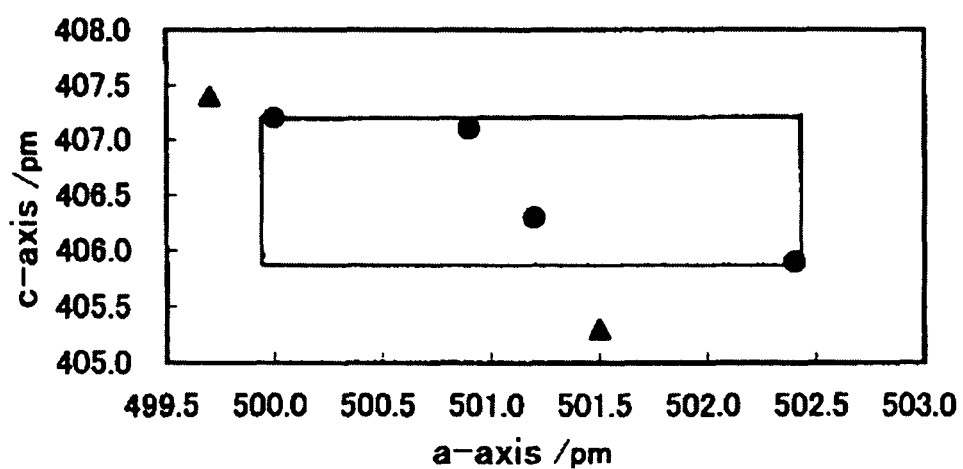
FIG. 24 is a graph wherein samples of $5.30 \leq ABx$ (a+b+c+d)<5.35 are plotted in coordinate axes consisting of a vertical axis (c-axis length) and a horizontal axis (a-axis length), and the region where pulverization residual rate after 50 cycles is 50% or more is shown.
Figure 25:
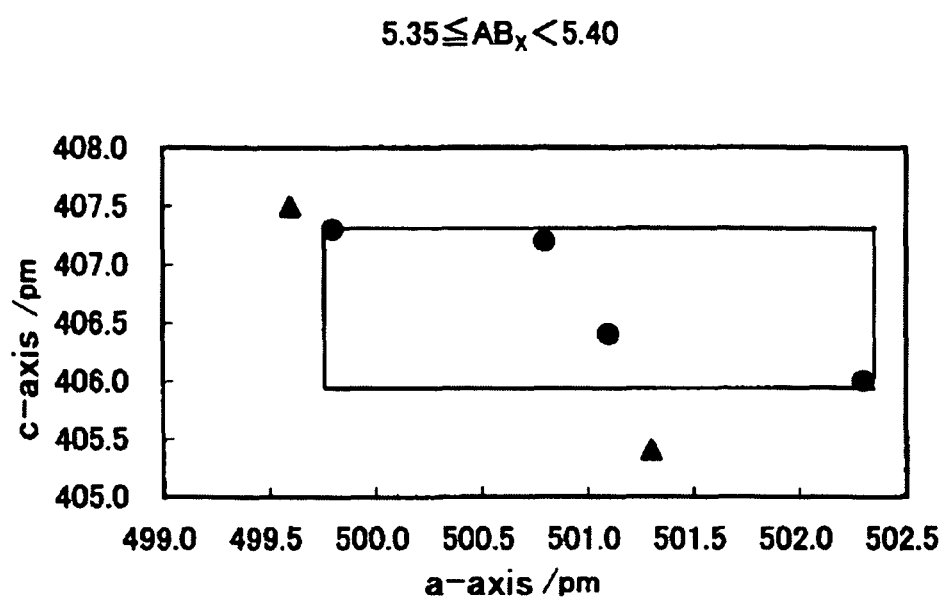
FIG. 25 is a graph wherein samples of $5.35 \leq ABx$ (a+b+c+d)<5.40 are plotted in coordinate axes consisting of a vertical axis (c-axis length) and a horizontal axis (a-axis length), and the region where pulverization residual rate after 50 cycles is 50% or more is shown.
Figure 26:
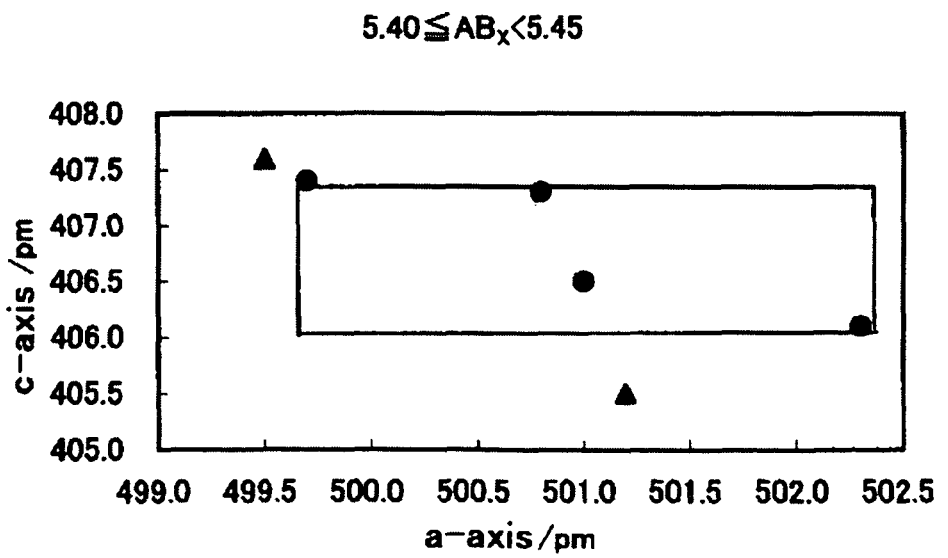
FIG. 26 is a graph wherein samples of $5.40 \leq ABx$ (a+b+c+d)<5.45 are plotted in coordinate axes consisting of a vertical axis (c-axis length) and a horizontal axis (a-axis length), and the region where pulverization residual rate after 50 cycles is 50% or more is shown.

For example, in the case of FIG. 22, specifically the case of $5.20 \leq ABx < 5.25$, there were no samples having a pulverization residual rate after 50 cycles of 50% or more. Whereas, in the cases of FIGS. 23 to 26, for example as shown in FIG. 23, the samples within the range (frame in FIG. 23) of the a-axis length of not less than 500.5 pm and not more than 502.7 pm, and the c-axis length of not less than 405.6 pm and not more than 406.9 pm, had a pulverization residual rate after 50 cycles of 50% or more, and the samples being plotted outside of the frame had a pulverization residual rate after 50 cycles of less than 50%. For other drawings, similar things could be said.

As described above, it was found that low Co-hydrogen storage alloys having a pulverization residual rate after 50 cycles of 50% or more could be specified, by finely classifying the ranges of AB ratio (ABx), and specifying the ranges of the a-axis length and the c-axis length for each range of AB ratio (ABx).

TABLE 6

$5.20 \leq AB_x < 5.25$

| a-Axis/pm | c-Axis/pm | 50-D (%) |
| --- | --- | --- |
| 501.9 | 404.8 | 30 |
| 502.9 | 405.4 | 33 |
| 501.7 | 405.8 | 35 |
| 501.4 | 406.6 | 37 |
| 500.7 | 406.7 | 35 |
| 500.3 | 406.9 | 33 |

TABLE 7

$5.25 \leq AB_x < 5.30$

| a-Axis/pm | c-Axis/pm | 50-D (%) |
| --- | --- | --- |
| 501.7 | 405.0 | 37 |
| 502.7 | 405.6 | 59 |
| 501.5 | 406.0 | 63 |
| 501.2 | 406.8 | 64 |
| 500.5 | 406.9 | 58 |
| 500.1 | 407.1 | 35 |

TABLE 8

$5.30 \leq AB_x < 5.35$

| a-Axis/pm | c-Axis/pm | 50-D (%) |
| --- | --- | --- |
| 501.5 | 405.3 | 47 |
| 502.4 | 405.9 | 59 |
| 501.2 | 406.3 | 75 |
| 500.9 | 407.1 | 76 |
| 500.0 | 407.2 | 66 |
| 499.7 | 407.4 | 36 |

TABLE 9

$5.35 \leq AB_x < 5.40$

| a-Axis/pm | c-Axis/pm | 50-D (%) |
| --- | --- | --- |
| 501.3 | 405.4 | 46 |
| 502.3 | 406.0 | 61 |
| 501.1 | 406.4 | 73 |
| 500.8 | 407.2 | 67 |

TABLE 9-continued

| 5.35 ≤ AB$_x$ < 5.40 | | |
|---|---|---|
| a-Axis/pm | c-Axis/pm | 50-D (%) |
| 499.8 | 407.3 | 60 |
| 499.6 | 407.5 | 35 |

TABLE 10

| 5.40 ≤ AB$_x$ < 5.45 | | |
|---|---|---|
| a-Axis/pm | c-Axis/pm | 50-D (%) |
| 501.2 | 405.5 | 42 |
| 502.3 | 406.1 | 59 |
| 501.0 | 406.5 | 68 |
| 500.8 | 407.3 | 65 |
| 499.7 | 407.4 | 55 |
| 499.5 | 407.6 | 33 |

What is claimed is:

1. A low Co hydrogen storage alloy having a CaCu$_5$ crystal structure that can be represented by the general formula MmNi$_a$Mn$_b$Al$_c$Co$_d$, wherein Mm is a Misch metal, 4.31≦a≦4.7, 0.3≦b≦0.65, 0.2≦c<0.37, ≦0<d≦0.2,
wherein, in a composition of 5.25≦a+b+c+d<5.30, the a-axis length of the crystal lattice is not less than 500.5 pm and not more than 502.7 pm, and the c-axis length is not less than 405.6 pm and not more than 406.9 pm,
wherein the pulverization residual rate obtained by the following equation is 50% or more:

Pulverization residual rate (%)=(post-cycling particle size/pre-cycling particle size)×100, when a hydrogen storage alloy is ground and screened to select particles with a particle size in the range of 20 μm and 53 μm to provide hydrogen storage alloy powder, and after measuring with a particle size distribution measuring device the average particle size (pre-cycling particle size, D$_{50}$) of the hydrogen storage alloy powder; 2 g of the hydrogen storage alloy powder is weighed and placed into a PCT holder; the surfaces thereof are cleaned twice under hydrogen pressure of 1.75 MPa; then activation is carried out twice by introducing hydrogen of 3 MPa; next, a cycle test using a PCT device is then repeated 50 times, wherein hydrogen gas of 3 MPa is introduced into 2.0 g of the hydrogen storage alloy powder to absorb hydrogen, and the hydrogen is desorbed at 45° C.; and the average particle size of the hydrogen storage alloy powder after the test of the 50 cycles (post-cycling particle size, D$_{50}$) is measured with a particle size distribution measuring device.

2. A cell having a configuration comprising the low Co hydrogen storage alloy according to claim 1 as a negative-electrode active material.

3. A low Co hydrogen storage alloy having a CaCu$_5$ crystal structure according to claim 1, wherein 0.4<b≦0.55 in the general formula MmNi$_a$Mn$_b$Al$_c$Co$_d$.

4. A cell having a configuration comprising a low Co hydrogen storage alloy according to claim 3 as a negative-electrode active material.

5. A low Co hydrogen storage alloy having a CaCu$_5$ crystal structure that can be represented by the general formula MmNi$_a$Mn$_b$Al$_c$Co$_d$, wherein Mm is a Misch metal, 4.31≦a≦4.7, 0.3≦b≦0.65, 0.2≦c<0.37, ≦0<d≦0.2,
wherein, in a composition of 5.30≦a+b+c+d<5.35, the a-axis length of the crystal lattice is not less than 500.0 pm and not more than 502.4 pm, and the c-axis length is not less than 405.9 pm and not more than 407.2 pm,
wherein the pulverization residual rate obtained by the following equation is 50% or more:

Pulverization residual rate (%)=(post-cycling particle size/pre-cycling particle size)×100, when a hydrogen storage alloy is ground and screened to select particles with a particle size in the range of 20 μm and 53 μm to provide hydrogen storage alloy powder, and after measuring with a particle size distribution measuring device the average particle size (pre-cycling particle size, D$_{50}$) of the hydrogen storage alloy powder; 2 g of the hydrogen storage alloy powder is weighed and placed into a PCT holder; the surfaces thereof are cleaned twice under hydrogen pressure of 1.75 MPa; then activation is carried out twice by introducing hydrogen of 3 MPa; next, a cycle test using a PCT device is then repeated 50 times, wherein hydrogen gas of 3 MPa is introduced into 2.0 g of the hydrogen storage alloy powder to absorb hydrogen, and the hydrogen is desorbed at 45° C.; and the average particle size of the hydrogen storage alloy powder after the test of the 50 cycles (post-cycling particle size, D$_{50}$) is measured with a particle size distribution measuring device.

6. A low Co hydrogen storage alloy having a CaCu$_5$ crystal structure that can be represented by the general formula MmNi$_a$Mn$_b$Al$_c$Co$_d$, wherein Mm is a Misch metal, 4.31≦a≦4.7, 0.3≦b≦0.65, 0.2≦c<0.37, ≦0<d≦0.2,
wherein, in a composition of 5.35≦a+b+c+d<5.40, the a-axis length of the crystal lattice is not less than 499.8 pm and not more than 502.3 pm, and the c-axis length is not less than 406.0 pm and not more than 407.3 pm,
wherein the pulverization residual rate obtained by the following equation is 50% or more:

Pulverization residual rate (%)=(post-cycling particle size/pre-cycling particle size)×100, when a hydrogen storage alloy is ground and screened to select particles with a particle size in the range of 20 μm and 53 μm to provide hydrogen storage alloy powder, and after measuring with a particle size distribution measuring device the average particle size (pre-cycling particle size, D$_{50}$) of the hydrogen storage alloy powder; 2 g of the hydrogen storage alloy powder is weighed and placed into a PCT holder; the surfaces thereof are cleaned twice under hydrogen pressure of 1.75 MPa; then activation is carried out twice by introducing hydrogen of 3 MPa; next, a cycle test using a PCT device is then repeated 50 times, wherein hydrogen gas of 3 MPa is introduced into 2.0 g of the hydrogen storage alloy powder to absorb hydrogen, and the hydrogen is desorbed at 45° C.; and the average particle size of the hydrogen storage alloy powder after the test of the 50 cycles (post-cycling particle size, D$_{50}$) is measured with a particle size distribution measuring device.

7. A low Co hydrogen storage alloy having a CaCu$_5$ crystal structure that can be represented by the general formula MmNi$_a$Mn$_b$Al$_c$Co$_d$, wherein Mm is a Misch metal, 4.31≦a≦4.7, 0.3≦b≦0.65, 0.2≦c<0.37, ≦0<d≦0.2,
wherein, in a composition of 5.40≦a+b+c+d<5.45, the a-axis length of the crystal lattice is not less than 499.7 pm and not more than 502.3 pm, and the c-axis length is not less than 406.1 pm and not more than 407.4 pm,
wherein the pulverization residual rate obtained by the following equation is 50% or more:

Pulverization residual rate (%)=(post-cycling particle size/pre-cycling particle size)×100, when a hydrogen storage alloy is ground and screened to select particles with a particle size in the range of 20 μm and 53 μm to provide hydrogen storage alloy powder, and after measuring with a particle size distribution measuring device the average particle size (pre-cycling particle size, $D_{50}$) of the hydrogen storage alloy powder; 2 g of the hydrogen storage alloy powder is weighed and placed into a PCT holder; the surfaces thereof are cleaned twice under hydrogen pressure of 1.75 MPa; then activation is carried out twice by introducing hydrogen of 3 MPa; next, a cycle test using a PCT device is then repeated 50 times, wherein hydrogen gas of 3 MPa is introduced into 2.0 g of the hydrogen storage alloy powder to absorb hydrogen, and the hydrogen is desorbed at 45° C.; and the average particle size of the hydrogen storage alloy powder after the test of the 50 cycles (post-cycling particle size, $D_{50}$) is measured with a particle size distribution measuring device.

* * * * *

UNITED STATES PATENT AND TRADEMARK OFFICE
CERTIFICATE OF CORRECTION

| | |
|---|---|
| PATENT NO. | : 8,535,460 B2 |
| APPLICATION NO. | : 10/566433 |
| DATED | : September 17, 2013 |
| INVENTOR(S) | : Daisuke Mukai et al. |

It is certified that error appears in the above-identified patent and that said Letters Patent is hereby corrected as shown below:

In the Specifications

Column 1, Line 6, delete "base" and insert -- based --

Signed and Sealed this
First Day of April, 2014

Michelle K. Lee
*Deputy Director of the United States Patent and Trademark Office*

UNITED STATES PATENT AND TRADEMARK OFFICE
CERTIFICATE OF CORRECTION

PATENT NO.       : 8,535,460 B2                                Page 1 of 1
APPLICATION NO.  : 10/566433
DATED            : September 17, 2013
INVENTOR(S)      : Mukai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 567 days.

Signed and Sealed this

Fifteenth Day of September, 2015

Michelle K. Lee
*Director of the United States Patent and Trademark Office*